United States Patent [19]
Okawa et al.

[11] Patent Number: 5,591,906
[45] Date of Patent: Jan. 7, 1997

[54] TIRE PRESSURE DROP DETECTING DEVICE AND METHOD

[75] Inventors: Yasushi Okawa; Isao Isshiki, both of Osaka, Japan

[73] Assignee: Sumitomo Electric Industries, Ltd., Japan

[21] Appl. No.: 241,997

[22] Filed: May 12, 1994

[30]  Foreign Application Priority Data

Sep. 16, 1992 [JP] Japan ................................. 4-246848
Sep. 16, 1992 [JP] Japan ................................. 4-246849
Sep. 16, 1992 [JP] Japan ................................. 4-246850
Sep. 16, 1992 [JP] Japan ................................. 4-246851
Sep. 14, 1993 [WO] WIPO ...................... PCT/JP93/01316

[51] Int. Cl.⁶ ................................................ B60C 23/00
[52] U.S. Cl. ...................... 73/146.5; 340/444; 340/671; 364/558; 364/565; 364/426.01
[58] Field of Search ............................... 73/146.2, 146.3, 73/146.4, 146.5; 340/442, 443, 444, 671, 438, 448; 364/558, 565, 426.01, 426.02, 426.03, 426.04

[56]  References Cited

U.S. PATENT DOCUMENTS

| | | | |
|---|---|---|---|
| 4,876,528 | 10/1989 | Walker et al. | 340/442 |
| 5,192,929 | 3/1993 | Walker et al. | 340/444 |
| 5,218,862 | 6/1993 | Hurrell, II et al. | 73/146.5 |
| 5,239,469 | 8/1993 | Walker et al. | 364/424.03 |
| 5,248,957 | 9/1993 | Walker et al. | 340/444 |
| 5,252,946 | 10/1993 | Walker et al. | 340/444 |
| 5,343,741 | 9/1994 | Nishihara et al. | 73/146.2 |
| 5,345,217 | 9/1994 | Prottey | 340/442 |

FOREIGN PATENT DOCUMENTS

| | | | |
|---|---|---|---|
| 441599A | 8/1991 | European Pat. Off. | 340/444 |
| 441600A | 8/1991 | European Pat. Off. | 340/444 |
| 0489563 | 6/1992 | European Pat. Off. | |
| 0489562 | 6/1992 | European Pat. Off. | |
| 0497120 | 8/1992 | European Pat. Off. | |
| 512745A | 11/1992 | European Pat. Off. | 340/444 |
| 0552827 | 7/1993 | European Pat. Off. | |
| 0554131 | 8/1993 | European Pat. Off. | |
| 3236520 | 4/1984 | Germany . | |
| 3630116 | 3/1988 | Germany . | |
| 63305011 | 12/1988 | Japan | 340/444 |
| 5116512 | 5/1993 | Japan | 340/444 |
| 0291217 | 11/1988 | United Kingdom | 340/444 |
| 2271209 | 4/1994 | United Kingdom | 340/444 |

*Primary Examiner*—Hezron E. Williams
*Assistant Examiner*—Richard A. Moller
*Attorney, Agent, or Firm*—Beveridge, DeGrandi, Weilacher & Young, L.L.P.

[57]  ABSTRACT

The present invention is directed to a device for and a method of detecting a tire pressure drop for a four-wheel vehicle. When F1, F2, F3 and F4 are respectively taken as the rotational angular velocities of four tires, a judged value dF given by the following equation (A) is found:

$$dF = (F1+F4)/(F2+F3) \qquad (A)$$

The judged value dF is the ratio of the sum of the rotational angular velocities (F1+F4) of a pair of tires on a diagonal line to the sum of the rotational angular velocities (F2+F3) of the other pair of tires. If the pneumatic pressures of the four tires are all normal, (F1+F4)=(F2+F3), so that dF=1. On the other hand, if the pneumatic pressure of any one of the tires drops, dF≠1. Accordingly, it is judged that the pneumatic pressure of a tire drops by comparing the judged value with a predetermined value.

50 Claims, 19 Drawing Sheets

F I G. 6
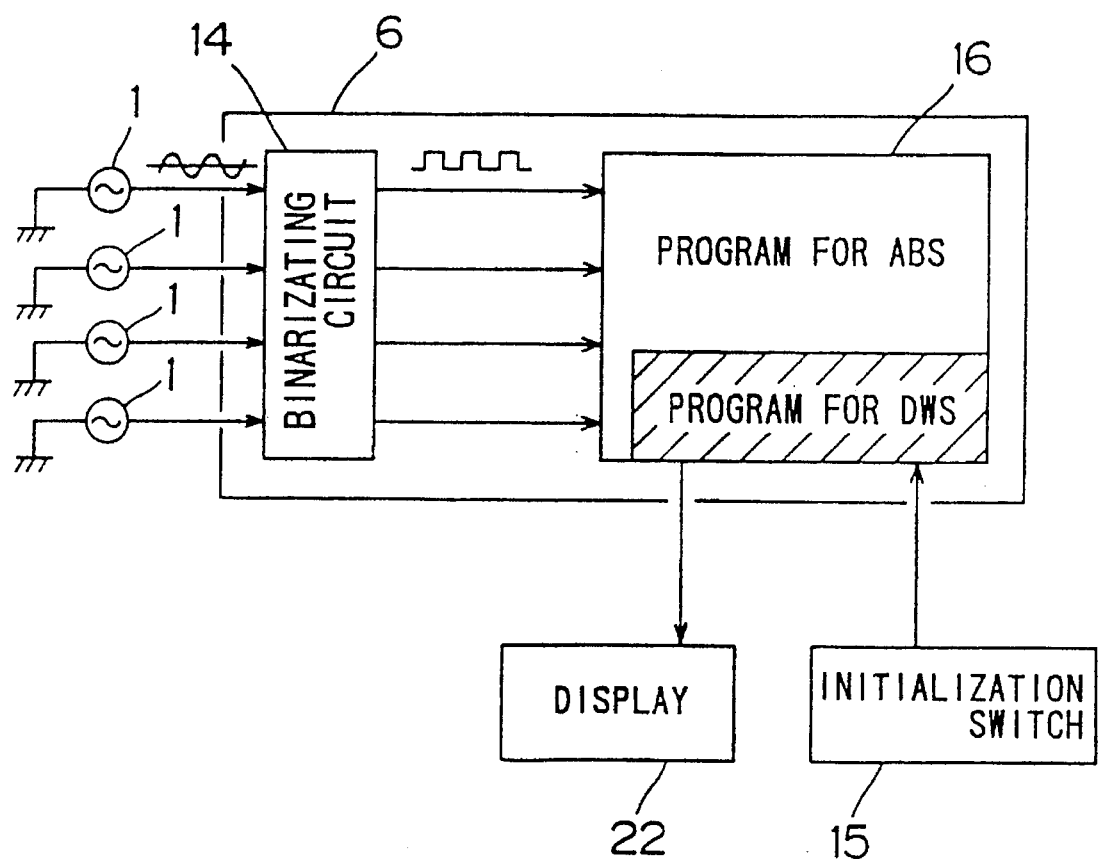

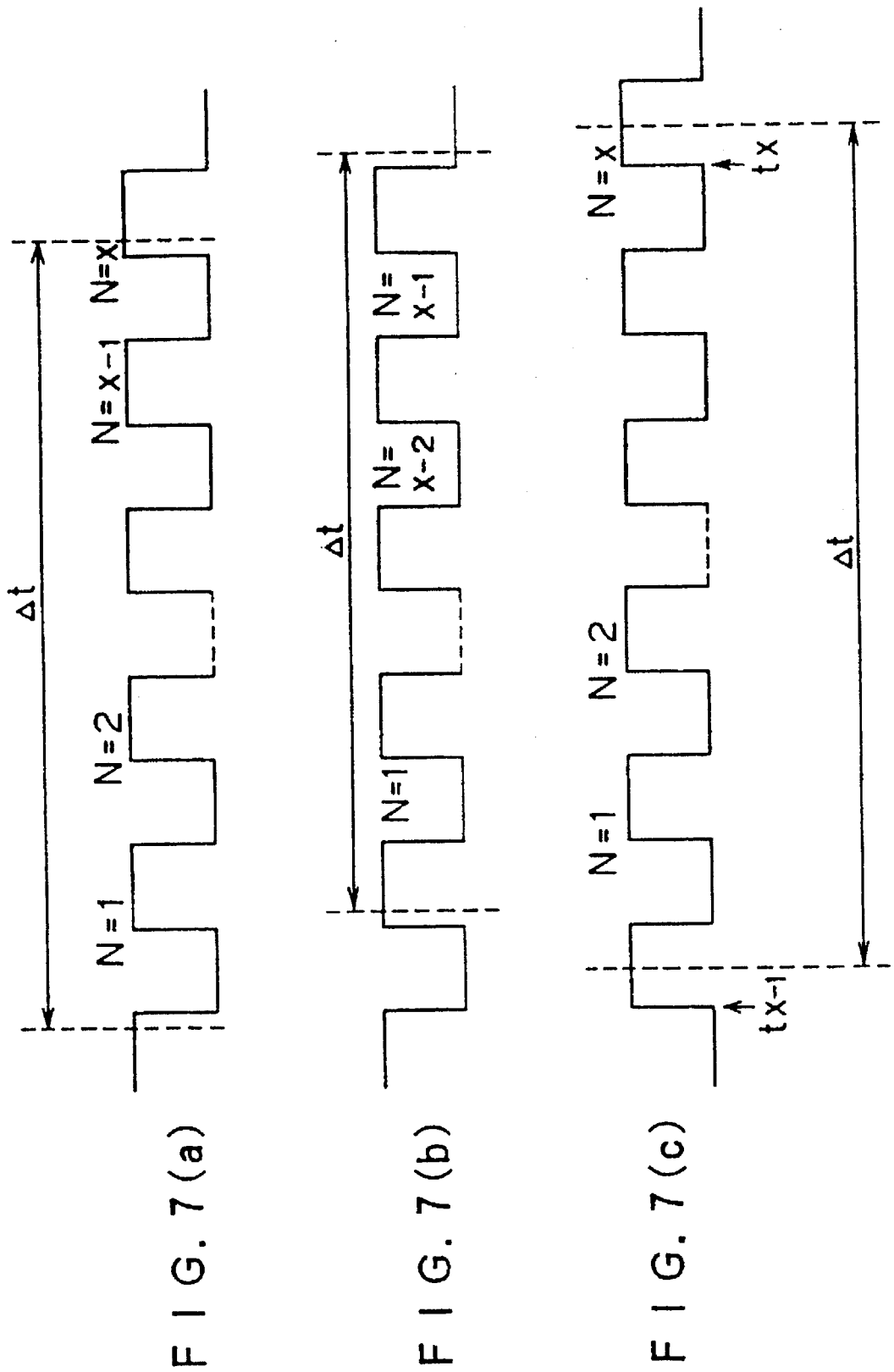

TIRE PRESSURE DROP DETECTING DEVICE AND METHOD

TECHNICAL FIELD

The present invention relates generally to detection of a tire pressure drop for a four-wheel vehicle, and more particularly, to a device for and a method of detecting a tire whose pneumatic pressure drops on the basis of the speeds of rotation of four tires.

BACKGROUND ART

As one of many safety devices for a four-wheel vehicle such as an automobile or a truck, tire pressure drop detecting devices have been invented, and some of them have been put to practical use. There is a great request to detect a tire pressure drop for a vehicle particularly in Europe. The reason for this is that in European countries where expressways are developed, a tire pressure drop of a vehicle which is traveling at high speed is liable to cause a large accident.

Examples of the conventional tire pressure drop detecting devices which have been put to practical use include one for directly measuring tire pressures. In this conventional device, pressure sensors are respectively provided in tires, and the pneumatic pressures of the tires are directly measured by the pressure sensors. The measured tire pressures are applied to a processing device provided on the side of the body of a vehicle. The pressure sensors and the processing device are coupled to each other, for example, electromagnetically, thereby making it possible to mechanically send and receive signals in a non-contact state. The tire pressures processed by the processing device are displayed on a display or the like.

The device so constructed that pressure sensors are provided in the tires has the disadvantage of being very high in cost. In addition, it also has the disadvantage in that errors are liable to occur at the time of signal transmission, although signals are electromagnetically transmitted to the processing device provided on the side of the body of the vehicle from the pressure sensors provided in the tires. Particularly, the vehicle may, in some cases, travel under bad conditions, for example, on a road having a lot of earth magnetism, thus causing many barriers against electromagnetic signal transmission.

Therefore, as another conventional example, a tire pressure drop detecting method for detecting the rotational angular velocities of four tires and detecting a tire whose pneumatic pressure relatively drops on the basis of the rotational angular velocities of the respective tires has been proposed (see Japanese Patent Unexamined Publication No. 63-305011, for example).

In this conventional detecting method, the sum of the rotational angular velocities of a pair of tires on a diagonal line is subtracted from the sum of rotational angular velocities of the other pair of tires on another diagonal line, and a reduced pressure tire is detected if the result of the subtraction is in a range of 0.05% to 0.6%, preferably, in a range of 0.1% to 0.3% of the average value of the two sums.

However, the conventional method of detecting a reduced pressure tire on the basis of the rotational angular velocities of the tires has the following disadvantages. Specifically, in order to obtain an amount of the change in the rotational angular velocity of the reduced pressure tire, the average value of the rotational angular velocities of the four tires is taken as a reference amount, thus detecting the amount of the change in the rotational angular velocity of the reduced pressure tire on the basis of the reference amount. Therefore, the reference amount also includes the rotational angular velocity of the reduced pressure tire, so that the reference amount is not exact and the accuracy of the detection is not high.

Furthermore, the conventional detecting method also has the disadvantage in that the calculation of the rotational angular velocity for each of the tires which is the basis of the detection is not accurately conducted.

More specifically, in the conventional method, each of the tires is provided with a sensor for generating a signal having a frequency proportional to the rotational angular velocity of the tire to count the arising edges or the falling edges of an output signal of the sensor in a measuring period. Since the measuring period and the arising edges or the falling edges of the output signal of the sensor are not synchronized with each other, however, the timing of starting the measuring period and the timing of the arising edges or the falling edges of the output signal of the sensor vary for each measuring period. Therefore, the conventional method has the disadvantage in that an error occurs in the calculation of the rotational angular velocity.

Furthermore, as still another conventional example, a device for detecting a reduced pressure tire on the basis of a wheel speed signal, which is provided with a steering angle sensor and an acceleration sensor to inhibit the reduced pressure tire from being detected while a vehicle is cornering and is being accelerated or decelerated has been proposed (see Japanese Patent Unexamined Publication No. 63-64804).

In the conventional device, however, the steering angle sensor for detecting the steering angle of a handle is indispensable so as to prevent the erroneous detection of the reduced pressure tire in a case where the vehicle is cornering, and a gravity sensor for detecting the acceleration or the deceleration of the vehicle is required. Therefore, the conventional device has the disadvantages of being complicated in construction and being high in cost.

BRIEF SUMMARY AND OBJECTS OF THE INVENTION

The present invention has been made so as to eliminate the disadvantages of the prior art and has for its object to provide a device capable of accurately detecting the rotational angular velocities of tires and capable of detecting a tire pressure drop without erroneous detection on the basis of the accurate rotational angular velocities.

A more basic object of the present invention is as follows.

First, the object is related to the development of a run flat tire. The run flat tire is a tire so adapted as to roll over a distance of approximately 300 Km at a speed of not more than 80 Km/h even in a state where it went flat. In a vehicle on which such a run flat tire is mounted, even if the tire goes flat to cause the drop in the pneumatic pressure of the tire, a driver is often unaware of the drop in the pneumatic pressure. If the vehicle travels at a speed exceeding the speed limit or travels beyond the limit of the travel distance in a state where the tire went flat, the tire bursts, for example, which is liable to cause an accident. Therefore, one object is to detect the drop in the pneumatic pressure of such a run flat tire.

Another object of the present invention is to quickly detect, when a tire is slightly deflated, for example, by a pressure of 0.5 atm, the deflation and inform a driver of the deflation to prevent an accident. Generally, even if the tire is deflated by a pressure of approximately 0.5 atm, a driver is often unaware of the deflation, so that a device capable of detecting the deflation has been desired.

Furthermore, another basic object is to satisfy, when a nail or the like is struck in a tire so that the pneumatic pressure of the tire drops slowly to some extent, for example, in not less than 20 to 30 seconds, a request to quickly detect the deflation.

As described in the foregoing, the present invention has been made on the basis of a basic position to detect a tire pressure drop to prevent an accident and has for its object to provide a low-cost and high-precision device for realizing the position.

Another object of the present invention is to provide a method of detecting a tire pressure drop with high precision.

PRINCIPLE OF INVENTION

In a vehicle having four tires, the apparent rolling radius of each of the tires calculated by dividing the distance at which the vehicle proceeds during one rotation of the tire at the time of traveling by $2\pi$ is referred to as a rolling radius. This rolling radius varies by the following factors:

(1) the change in the pneumatic pressure of a tire (see FIG. 15), (2) the change in the load on a tire (see FIG. 16), (3) the change in the rotation speed of a tire, that is, the travel speed of a vehicle (see FIG. 17), (4) the change in the slip angle of a tire (see FIG. 18), (5) the change in the camber angle of a tire (see FIG. 18), (6) whether the vehicle is being accelerated or braked (see FIG. 19), (7) a vehicle is cornering, and (8) the wear of a tire (see FIG. 20).

If the rolling radius of a certain tire is changed, the rotation speed of the tire whose rolling radius varies is changed with the rotation speed of the other tire in an arbitrary speed of the vehicle.

Therefore, the present invention is directed to detecting a tire whose pneumatic pressure drops on the basis of the following procedure:

a. detecting the change in the rotation speed of the tire, b. excluding factors (the foregoing items (2) to (8)) other than the change in the pneumatic pressure of the tire which affect the change in the rolling radius of the tire, by suitably processing information on the rolling radius of the tire, and c. consequently, extracting the relationship between the pneumatic pressure of the tire and the rolling radius thereof to detect the change in the pneumatic pressure of the tire.

Utilization of ABS

In the present invention, preferably, ABS (Antilock-Braking-System) already provided for a vehicle is effectively utilized.

The ABS is currently mounted at the spread rate of approximately 35% of all vehicles in Europe, whereas in Japan that is 15 to 16%. This ABS is a system having wheel speed sensors for detecting the rotational states of four tires for determining whether or not each of the tires is in a slipping state, thus controlling the hydraulic pressure of a brake.

A signal system of the ABS is for controlling the hydraulic pressure of the brake as described above in the direction in which the brake is not actuated. If a malfunction occurs, therefore, the vehicle enters a very dangerous state. Consequently, a signal system high in reliability has been employed. In a preferred embodiment of the present invention, signals of the wheel speed sensors obtained from the reliable signal system are utilized, thereby realizing a tire pressure drop detecting device high in reliability at low cost.

In the present invention, when F1, F2, F3 and F4 are respectively taken as the rotational angular velocities of the four tires, a judged value dF given by the following equation (A) is found:

$$dF=(F1+F4)/(F2+F3) \quad (A)$$

The judged value dF is the ratio of the sum of the rotational angular velocities (F1+F4) of a certain pair of tires on a diagonal line to the sum of the rotational angular velocities (F2+F3) of another pair of tires. If the pneumatic pressures of the four tires are all normal, (F1+F4)=(F2+F3), so that dF=1. On the other, hand, if the pneumatic pressure of any one of the tires drops, dF≠1. Accordingly, it is judged that the pneumatic pressure of the tire drops by comparing the above described judged value dF with a predetermined value.

According to the present invention, when the pneumatic pressure of any one of the four tires drops, the amount of the change in the rotational angular velocity of the tire whose pneumatic pressure drops is detected utilizing the rotational angular velocities of the three other normal tires as a reference amount. Therefore, the rotational angular velocity of the reduced pressure tire is not included in the reference amount for comparison, unlike the prior art. Consequently, the detecting precision is not varied or degraded, which allows the detection with high precision.

When the four-wheel vehicle is in a predetermined state being not suitable for detection of a tire pressure drop, it is preferable that an operation for detecting the tire pressure drop is inhibited. This prevents an erroneous operation, thereby making it possible to derive only correct results of the detection.

Furthermore, it is preferable that the detected rotational angular velocity of each of the tires is subjected to a suitable correction on the basis of the behavior of the four-wheel vehicle. Even when the four-wheel vehicle is being accelerated or decelerated so that the travel speed thereof is varying or even when the four-wheel vehicle is cornering, therefore, it is possible to operate the judged value dF on the basis of the accurate rotational angular velocity corrected. This enables to accurately detect the drop in the pneumatic pressure of the tire.

The rotational angular velocity of the tire is detected by, for example, giving each tire the construction for generating pulses proportional to the rotation of the tire and counting the generated pulses within a predetermined measuring period. In this case, it is preferable that the rotational angular velocity of the tire is calculated in accordance with the following procedure. More specifically, the time elapsed from the time when the last pulse within the preceding measuring period is generated to the time when the last pulse within the present measuring period is generated is calculated as the reference time of the present measuring period. The number of pulses applied within the present measuring period is divided by the calculated reference time, thus finding the number of pulses per unit time. The rotational angular velocity of the tire is calculated on the basis of the number of pulses per unit time.

The measuring period and the period of the pulses are not synchronized with each other. However, the number of pulses per unit time is found on the basis of the time elapsed from the time when the last pulse within the preceding measuring period is applied to the time when the last pulse within the present measuring period is applied. Therefore, the number of pulses per unit time can be accurately calculated, which allows the rotational angular velocity of each of the tires to be accurately found.

When the pneumatic pressure of any one of the tires drops, it is possible to accurately detect the drop on the basis of the rotational angular velocity thus found for each of the tires.

BRIEF DESCRIPTION OF THE DRAWINGS

FIG. 6 is a block diagram showing an example of the circuit arrangement of a DWS according to still another embodiment of the present invention.

FIGS. 7(a), 7(b) and 7(c) are diagrams showing the relationship between wheel speed pulses inputted to a CPU 24 and the measuring period.

BEST MODE FOR CARRYING OUT THE INVENTION

Embodiments of the present invention will be described in detail with reference to the attached drawings.

Figure 1:
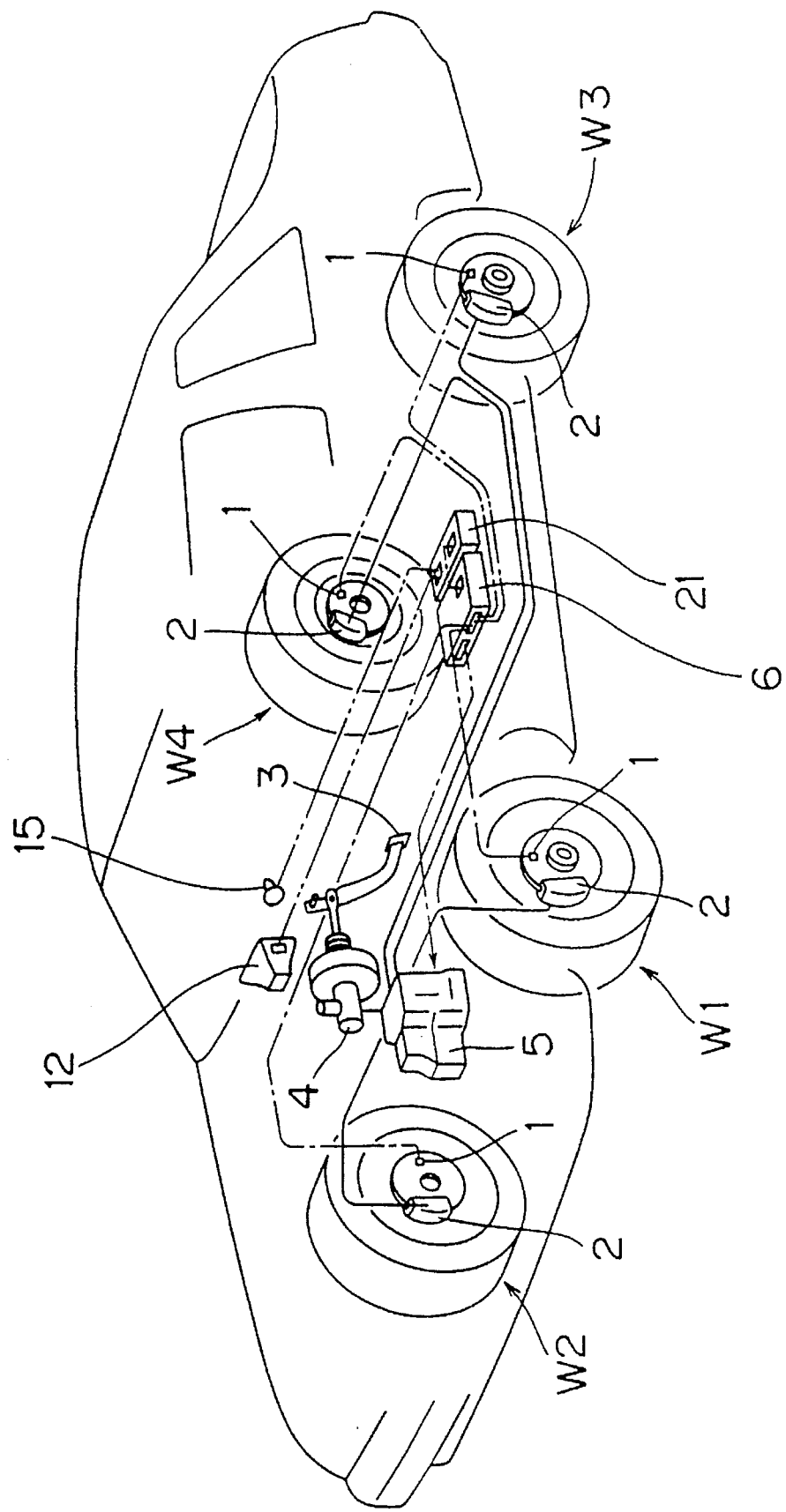
FIG. 1 is a diagram schematically showing the outline of a vehicle equipped with a tire pressure drop detecting device (DWS) according to one embodiment of the present invention and a conventionally known ABS.

FIG. 1 is a diagram showing the outline of a vehicle equipped with a tire pressure drop detecting device (hereinafter referred to as "DWS") according to one embodiment of the present invention and a conventionally known ABS.

The ABS is a device for electronically controlling, on the basis of outputs of wheel speed sensors 1 respectively provided in relation to four tires W1, W2, W3 and W4, the brake pressure of a brake 2 of each of wheels, thus avoiding a locked state of the wheel at the time of, for example, a rapid braking operation. Specifically, if a brake pedal 3 is strongly depressed, the hydraulic pressure from a master cylinder 4 is controlled by a hydraulic pressure unit 5 and is transmitted to the brake 2 of each of the wheels. A control unit for ABS 6 for monitoring the outputs of the four wheel speed sensors 1 is connected to the hydraulic pressure unit 5. In the control unit for ABS 6, if a so-called locked state of any one of the wheels is judged on the basis of the output of each of the wheel speed sensors 1, the hydraulic pressure unit 5 is controlled to reduce the brake pressure of the brake 2 of the wheel in the locked state.

In the ABS, an analog signal applied from each of the wheel speed sensors 1 is first subjected to binarizating processing in the control unit for ABS 6. A wheel speed signal obtained by the binarizating processing (hereinafter referred to as "wheel speed pulses") is used for the processing.

On the other hand, the DWS according to the embodiment comprises a control unit for DWS 21, a display 12 connected to the control unit for DWS 21, and an initialization switch 15 connected to the control unit for DWS 21 and operated by a driver. The control unit for DWS 21 receives the wheel speed pulses from the control unit for ABS 6 to detect the drop in each of the pneumatic pressures of the tires W1 to W4 on the basis of the wheel speed pulses. If the drop in the pneumatic pressure of any one of the tires W1 to W4 is detected, the result is displayed on the display 12. On the display 12, a tire whose pneumatic pressure drops is displayed, as described later.

Figure 2:
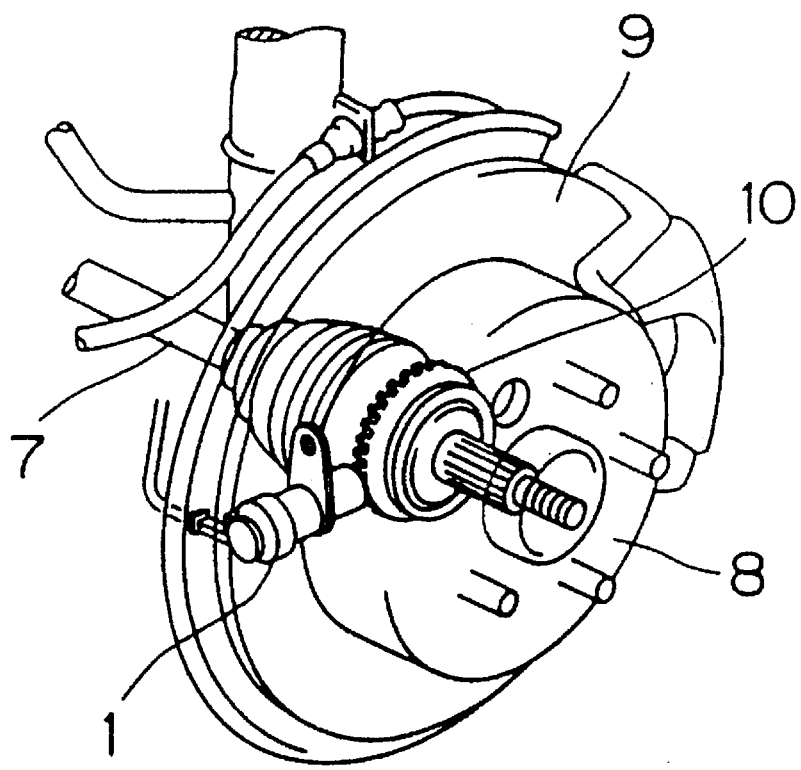
FIG. 2 is a perspective view showing one example of a mounting structure of a wheel speed sensor.

FIG. 2 is a perspective view showing one example of a mounting structure of the wheel speed sensor 1 described in FIG. 1. A wheel mounting member 8 and a brake disk 9 are fastened on an end of a wheel shaft 7. A sensor rotor 10 rotated integrally with the wheel shaft 7 is mounted on the inside of the brake disk 9. A plurality of teeth are projected at a predetermined pitch on the entire peripheral surface of the sensor rotor 10. The wheel speed sensor 1 is mounted on the peripheral surface of the sensor rotor 10 so as to be opposed to each other with predetermined spacing and in a fixed state where it is not rotated.

Figure 3:
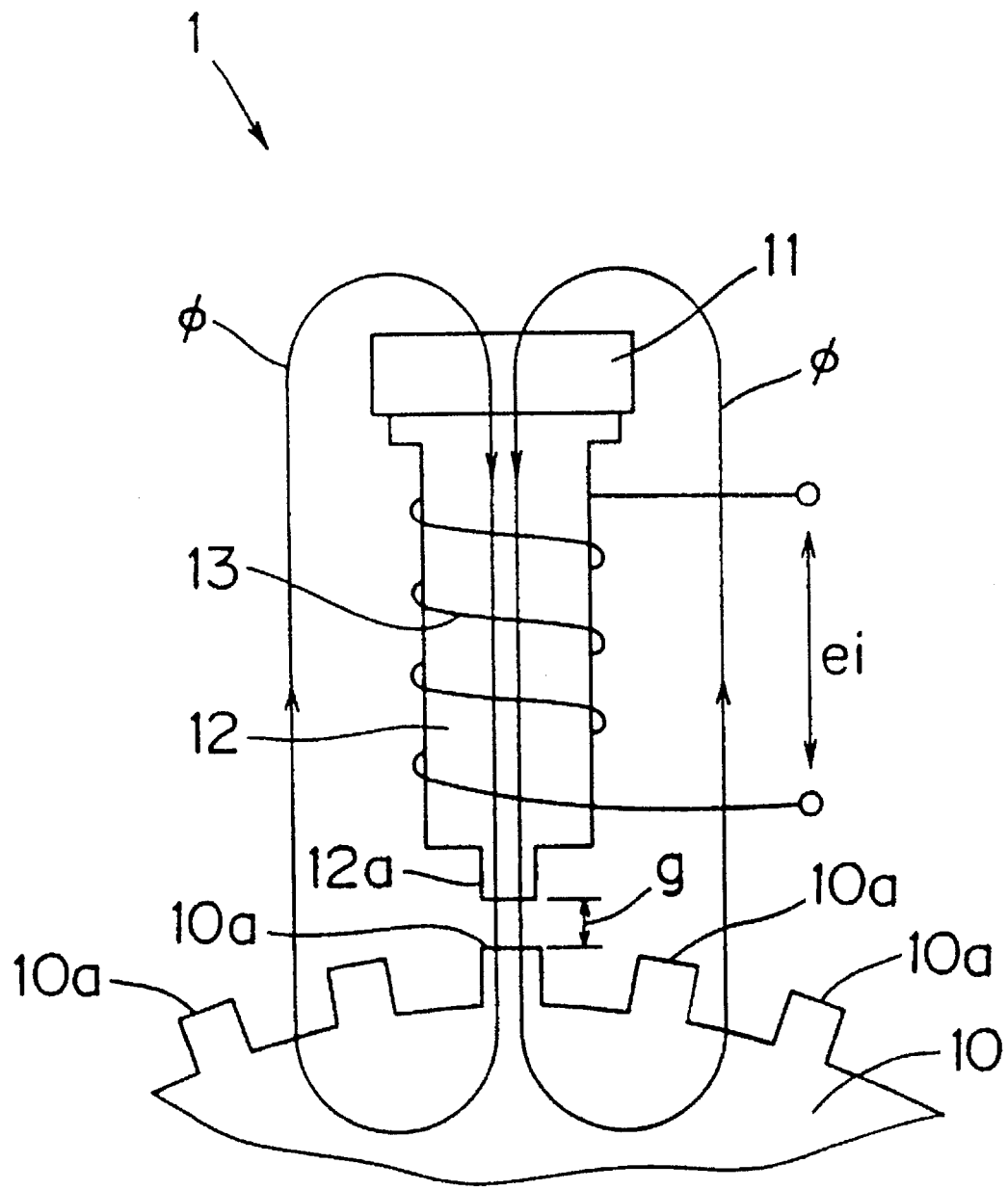
FIG. 3 is an illustration for explaining the principle of detecting the rotation by the wheel speed sensor.

FIG. 3 is an illustration for explaining the principle of detecting the rotation by the wheel speed sensor 1. The wheel speed sensor 1 introduces a magnetic flux $\phi$ formed by a permanent magnet 11 to the sensor rotor 10 by a pole piece 12 and takes out an electromotive force $e_i$ produced in both ends of a coil 13 wound around the pole piece 12. A gap g is formed between an end 12a of the pole piece 12 and the sensor rotor 10. The sensor rotor 10 is fixed to the wheel shaft 7 as described above, and is rotated with the rotation of the wheel shaft 7, that is, the rotation of the tire. In addition, a lot of teeth 10a are projected at a predetermined pitch, as described above, on the peripheral surface of the sensor rotor 10. Accordingly, the gap g between the end 12a of the pole piece 12 and the peripheral surface of the sensor rotor 10 changes as the sensor rotor 10 rotates. Since the magnetic flux φ penetrating the pole piece 12 varies with the change of the gap g, an electromotive force $e_i$ corresponding to the change in the magnetic flux φ produces in both ends of the coil 13. The electromotive force $e_i$ varies with a frequency corresponding to the rotation of the sensor rotor 10, thus finally obtaining a voltage signal $e_i$ having a frequency corresponding to the rotation speed of the tire.

In the embodiment, the number of teeth 10a projected on the peripheral surface of the sensor rotor 10 is, for example, about 45. If the sensor rotor 10 is rotated once, therefore, the 45 teeth 10a are opposed to the end 12a of the pole piece 12. Accordingly, if the sensor rotor 10 is rotated once, that is, the tire is rotated once, 45 AC signals are produced in both ends of the coil 13.

Figure 4:
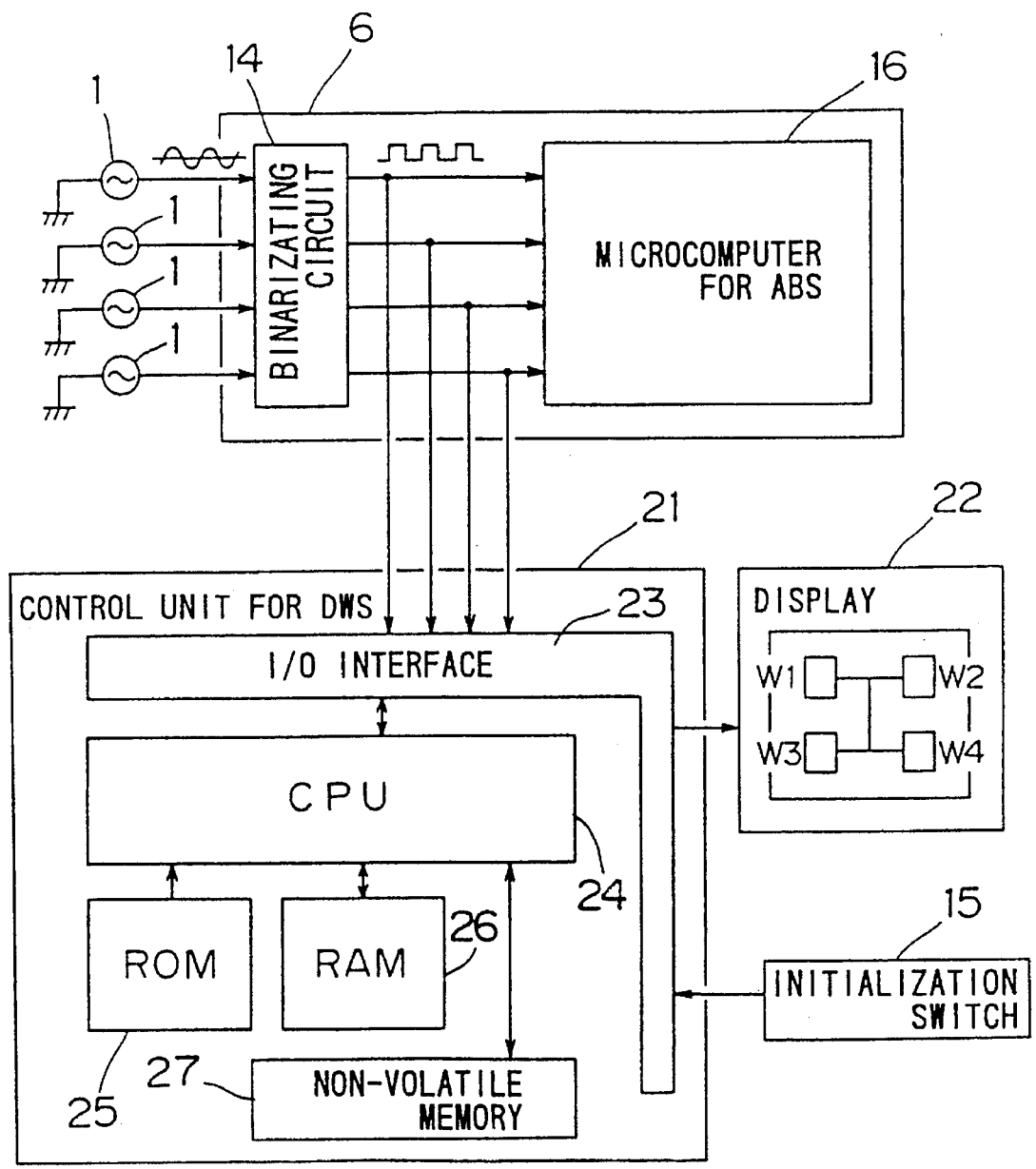
FIG. 4 is a block diagram showing the electrical construction of a DWS according to one embodiment of the present invention.

FIG. 4 is a block diagram showing the electrical construction of the DWS according to one embodiment of the present invention. As described in FIG. 1, the detection signals of the four wheel speed sensors 1 are applied to the control unit for ABS 6. The control unit for ABS 6 comprises a binarizing circuit 14 and a microcomputer for ABS 16. The detection signals of the wheel speed sensors 1 applied to the control unit for ABS 6 are first binarized in the binarizing circuit 14 and then, are supplied to the microcomputer for ABS 16.

The DWS according to the embodiment is so adapted as to receive the detection signals of the wheel speed sensors 1 in the ABS, as described above. In this case, the detection signal of each of the wheel speed sensors 1 is not directly applied to the control unit for DWS 21. Specifically, wheel speed pulses obtained after the detection signal is binarized in the binarizing circuit 14 in the control unit for ABS 6 are applied to the control unit for DWS 21.

Such connecting arrangement has two great advantages.

One advantage is that if a failure should occur in a portion, to which the wheel speed signal is inputted, of the control unit for DWS 21, it is possible to prevent the failure from exerting a fatal effect on the control unit for ABS 6. Consider a case where the control unit for DWS 21 is so constructed as to directly accept outputs of the wheel speed sensors 1, that is, signal lines of the wheel speed sensors 1 are respectively branched and connected to the control unit for DWS 21. In this case, if any one of the branched signal lines attains, for example, a ground level, an erroneous wheel speed detection signal is applied to the binarizing circuit 14 in the control unit for ABS 6. As a result, a malfunction may occur in the microcomputer for ABS 16. On the contrary, in the embodiment, the wheel speed pulses obtained after the detection signal is binarized by the binarizing circuit 14 in the control unit for ABS 6 are applied to the control unit for DWS 21. In this case, even if a failure occurs in the portion, to which the wheel speed signal is inputted, of the control unit for DWS 21, the failure does not exert a fatal effect on the control unit for ABS 6.

Another advantage is that the wheel speed pulses obtained by the binarizing processing are applied to the control unit for DWS 21, and it is therefore possible to simplify the portion, to which the wheel speed signal is inputted, of the control unit for DWS 21.

The DWS according to the embodiment comprises the control unit for DWS 21 to which the wheel speed pulses are applied, a display 22, and an initialization switch 15. The control unit for DWS 21 is constituted by a microcomputer, and its hardware configuration comprises an input-output interface 23 required to send and receive signals to and from an external device, a CPU 24 serving as the center of operation processing, a ROM 25 storing a control operation program of the CPU 24, a RAM 26 to which data or the like is temporarily written or from which the written data is read out when the CPU 24 performs a control operation, and a non-volatile memory 27 capable of holding stored data even when the power supply is turned off, as shown in FIG. 4. The RAM 26 comprises a time memory area, a measuring timer area, a pulse counter area, a work register area, and the like, as described later. In addition, data rejecting conditions, data correction factors and the like, as described later, are stored in the non-volatile memory 27.

If in the control unit for DWS 21, a tire whose pneumatic pressure drops is detected on the basis of the wheel speed pulses applied from the binarizating circuit 14, the result of the detection is outputted to the display 22 and is displayed thereon. The display 22 comprises display elements corresponding to the four tires W1, W2, W3 and W4, as shown in FIG. 4. If the tire whose pneumatic pressure drops is detected, the display element corresponding to the tire lights up or flickers. The display element may be constituted by an indicator lamp.

Furthermore, it is preferable that all the indicator lamps or the display elements W1 to W4 light up for a predetermined time period after an ignition switch of the vehicle is turned on so as to inform a driver that no failure occurs in the indicator lamps or the display elements.

The function of the initialization switch 15 shown in FIG. 4 will be described later.

Figure 5:
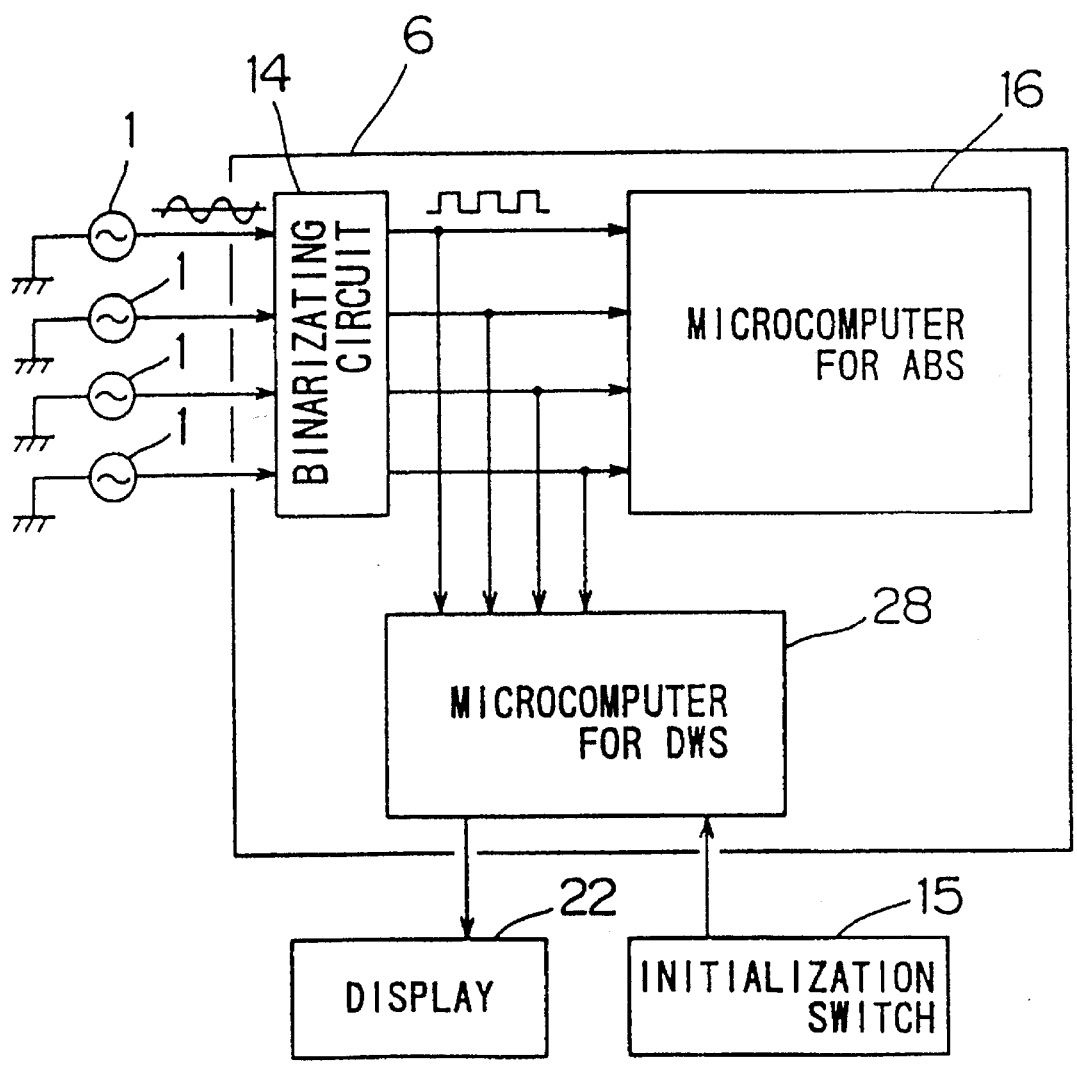
FIG. 5 is a circuit block diagram showing the electrical construction of a DWS according to another embodiment of the present invention.

FIG. 5 is a circuit block diagram showing the electrical construction of a DWS according to another embodiment of the present invention. The construction shown in FIG. 5 differs from the construction shown in FIG. 4 in that a microcomputer for DWS 28 is added to the inside of a control unit for ABS 6. Adding the microcomputer for DWS 28 to the inside of another unit, i.e., the control unit for ABS 6 in the embodiment, enables to effectively use the existing control unit. This does not increase the number of control units, thus reducing the circuit arrangement as well as cost.

In place of the construction Shown in FIG. 5 in which the microcomputer for DWS 28 is added to the inside of the control unit for ABS 6, a program for detecting a tire pressure drop may be added, as shown in FIG. 6, in addition to a program for ABS to the inside of a microcomputer for ABS 16. This allows the hardware configuration of the microcomputer to constitute a DWS only by adding a new program while utilizing the existing microcomputer for ABS 16 without any modification.

Description is now made as to how the wheel speed pulses applied are read by the CPU 24 in the control unit for DWS 21 described in FIG. 4.

The wheel speed pulses inputted to the CPU 24 shown in FIG. 4 are respectively pulse signals as shown in FIG. 7. The CPU 24 counts the applied wheel speed pulses for each predetermined measuring period Δt, to calculate the rotational angular velocity of each of tires W1 to W4 (see FIG. 1).

Meanwhile, the period of the wheel speed pulses inputted to the CPU 24 and the measuring period Δt in the CPU 24 are asynchronous. Therefore, the period of the wheel speed pulses and the measuring period Δt may, in some cases, be in the relationship as shown in FIG. 7(a), or as shown in FIG. 7(b) in the other cases. Specifically, in the cases as shown in FIG. 7(a), the number N of arising edges of the wheel speed pulses within the measuring period Δt is x. On the other hand, in the cases as shown in FIG. 7(b), the number N of arising edges of the wheel speed pulses within the measuring period Δt is (x−1). If the relationships between the timing of starting and that of terminating the measuring period Δt and the arising edges of the wheel speed pulses thus differ, an error of ±1 may, in some cases, occur in the number of wheel speed pulses counted within the same measuring period Δt. Particularly while the vehicle is traveling at low speed, the number of wheel speed pulses is small, so that the error rate is increased.

In the embodiment, therefore, the time when the last arising edge within each of the measuring periods Δt is detected, for example, $t_{x-1}$ or $t_x$ is stored, as shown in FIG. 7(c). The rotational angular velocity ω of a tire is found by the following equation letting the number of arising edges of wheel speed pulses counted within a certain measuring period Δt be x:

$$\omega = (k1 \cdot x)/(t_x - t_{x-1}) \qquad (1)$$

where k1: a constant

As a result, there occurs no error based on the fact that the period of the wheel speed pulses and the measuring period Δt are asynchronous. This enables to accurately count the wheel speed pulses. It is therefore possible to calculate the rotational angular velocity of each of tires without errors.

Figure 8A:
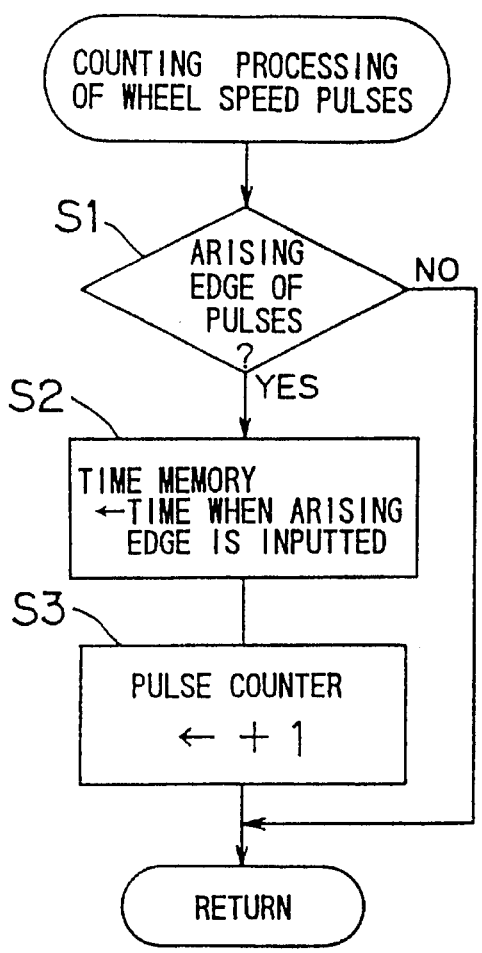
FIGS. 8(a) and 8(b) are flow charts showing the procedure for calculation processing of the rotational angular velocity of a tire.
Figure 8B:
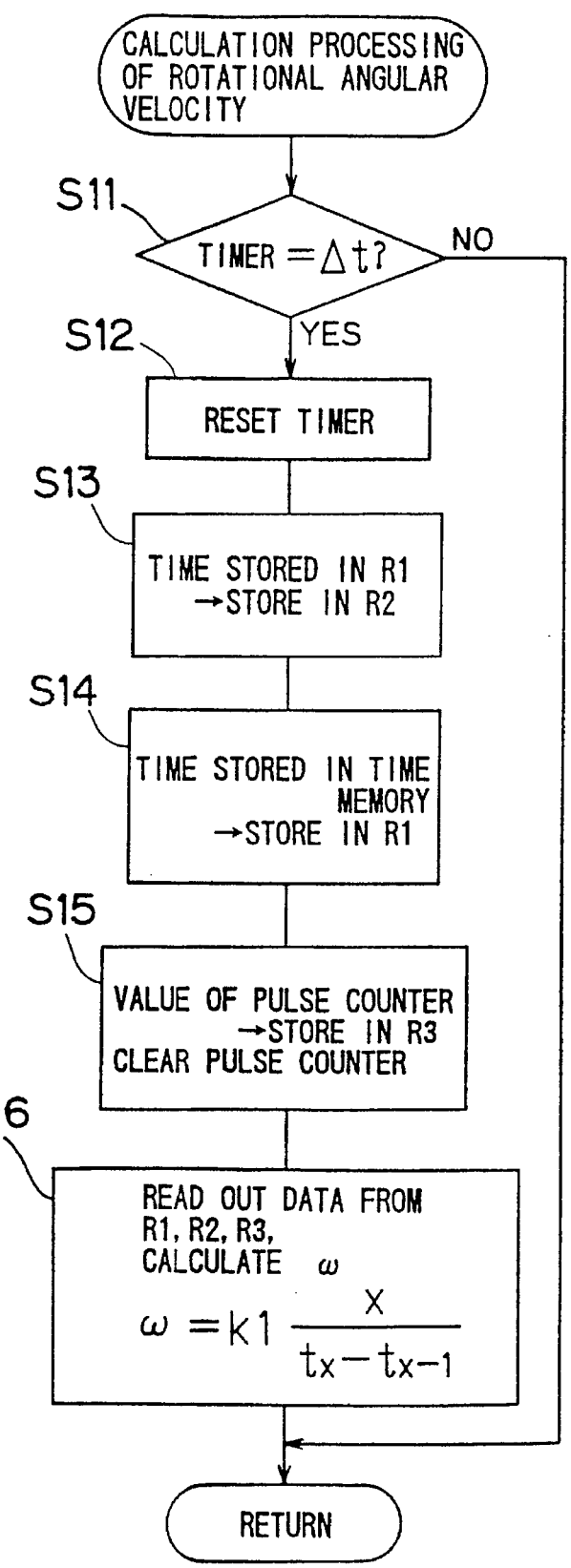

FIGS. 8(a) and 8(b) are flow charts showing the procedure for calculation processing of the rotational angular velocity of a tire in the CPU 24 (see FIG. 4). Referring now to FIG. 8, a method of calculating the rotational angular velocity of a tire will be described more concretely.

In the CPU 24, counting processing of the wheel speed pulses applied is performed. This processing is performed in accordance with the flow chart of FIG. 8(a). Specifically, if it is judged that an arising edge of the wheel speed pulses is inputted (step S1), the time when the arising edge is inputted is stored in a time memory (this time memory uses a storage area in the RAM 26 shown in FIG. 4) (step S2). The count value of a pulse counter (this pulse counter is also formed using a storage area in the RAM 26) is incremented by one.

The foregoing processing is repeated.

On the other hand, the calculation processing of the rotational angular velocity of a tire is performed in accordance with the flow chart of FIG. 8(b).

Specifically, it is judged whether or not the time measured by a measuring timer for measuring a measuring period Δt (this measuring timer is also formed using a storage area in the RAM 26, for example) reaches Δt (step S11). If it is judged that the measuring timer reaches the measuring period Δt (Δt can be set to, for example, several seconds below the decimal to several seconds), the measuring timer is reset (step S12). Consequently, the measuring timer starts to measure time from zero again. Further, in the preceding measuring period being stored in a work register R1 formed in a storage area of the RAM 26, the time $t_{x-1}$ when the last arising edge of the wheel speed pulses is detected is stored in another work register R2 (step S13). The time $t_x$ stored in the time memory (the time stored in the step S2) is stored in the work register R1 (step S14). As a result, the time $t_{x-1}$ when the last arising edge of the wheel speed pulses in the preceding measuring period is detected is stored in the work register R2, and the time $t_x$ when the last arising edge of the wheel speed pulses in the present measuring period is detected is stored in the work register R1.

The value of the pulse counter is then stored in still another work register R3. The pulse counter is then cleared (step S15).

The data stored in the three work registers R1, R2 and R3 are read out to calculate the rotational angular velocity ω of the tire (step S16). This calculation is made on the basis of the foregoing equation (1).

Accordingly, the rotational angular velocity of the tire for each measuring period Δt can be accurately calculated without errors.

In the above case, the falling edge of the wheel speed pulses may be detected in place of the arising edge thereof.

The counting processing of the wheel speed pulses and the calculation processing of the rotational angular velocity of the tire in the foregoing are respectively performed for each wheel speed sensor because there are provided four wheel speed sensors 1.

The following calculation processing may be performed in place of the calculation processing of the rotational angular velocity of the tire.

Figure 9:
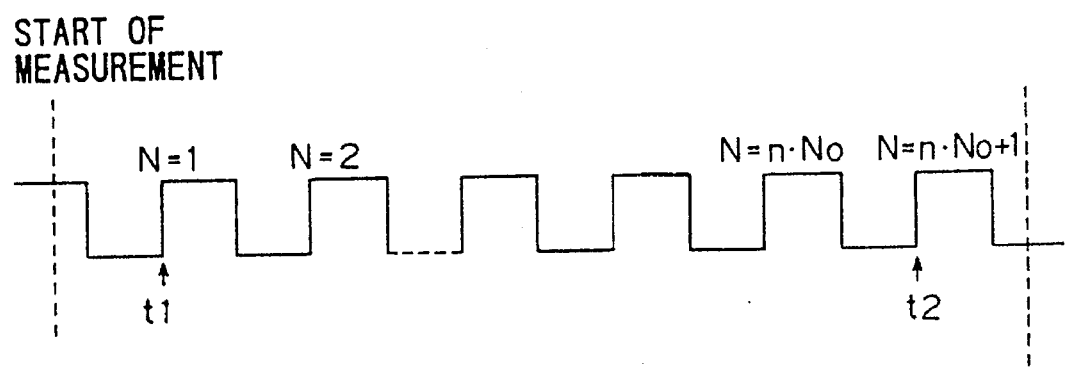
FIG. 9 is a timing chart for explaining another processing method of calculation processing of the rotational angular velocity of a tire.

Specifically, referring to FIG. 9, the time t1 when the first arising edge (or the first falling edge) of the wheel speed pulses is detected after the measurement is started is stored. In addition, the time t2 when integral multiples (n=1, 2, 3 . . . ) of the number NO of arising edges (or falling edges) of the wheel speed pulses per one rotation of the tire plus the first leading (or trailing) edge of the wheel speed pulses is stored. The rotational angular velocity ω of the tire is calculated by the following equation (2):

$$\omega = (k2 \cdot n)/(t2 - t1) \qquad (2)$$

where k2: a constant

Consider a case where such a method of calculating the rotational angular velocity is used. In this case, even if a pitch at which the teeth 10a are projected in the sensor rotor 10 (see FIG. 3) varies, no error occurs in the rotational angular velocity ω due to the variation. Therefore, it is possible to calculate the rotational angular velocity more accurately.

Also in the case of calculating the rotational angular velocity, the wheel speed pulses from the four wheel speed sensors 1 are respectively detected, to calculate the rotational angular velocities with respect to the respective tires W1 to W4.

Figure 10:
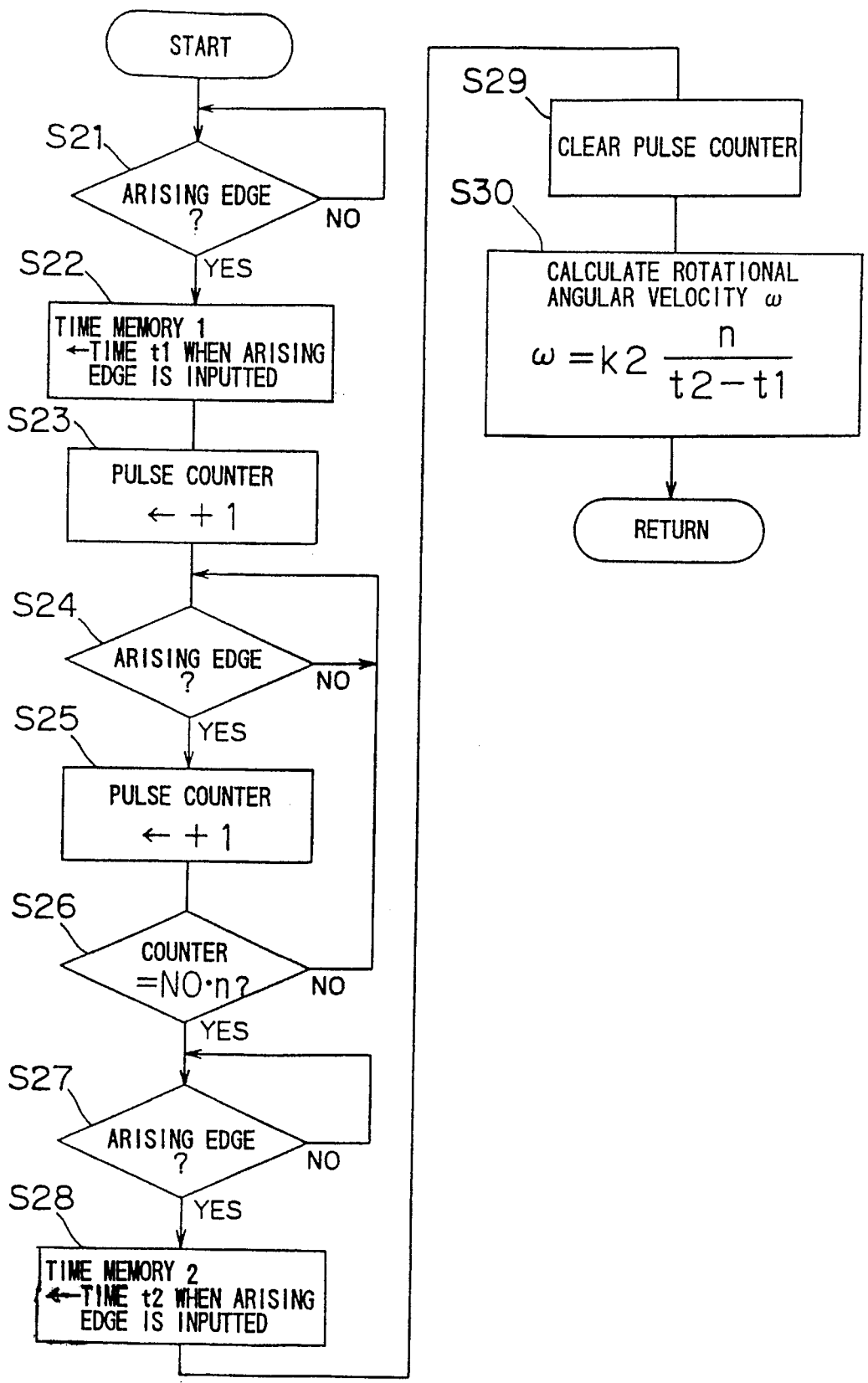
FIG. 10 is a flow chart showing the procedure for performing the calculation of the rotational angular velocity as described in FIG. 9.

FIG. 10 is a flow chart showing the procedure for processing in the CPU 24 in calculating the rotational angular velocity described with reference to FIG. 9.

Referring now to FIG. 10, a method of calculating the rotational angular velocity will be described more concretely. If the measurement of the wheel speed pulses is started, arising edges, for example, of the wheel speed pulses are detected (step S21). If the first arising edge is detected, the time t1 when the first arising edge is detected is stored in the time memory 1 (step 22). In addition, the count value of the pulse counter is set to "1" (step S23).

Thereafter, it is judged whether or not the succeeding arising edge of the wheel speed pulses is detected (step 24), and the pulse counter is incremented by one every time the arising edge is detected (step S25).

It is judged whether or not the count value of the pulse counter reaches integral multiples (n=1, 2, 3, . . . ) of a predetermined number NO of arising edges of the wheel speed pulses per one rotation of the tire (step S26). The processing in the steps 24 and 25 is repeated until the value of the pulse counter reaches NO×n.

If it is judged that the count value of the pulse counter reaches NO×n and the succeeding arising edge of the wheel speed pulses is detected (YES in steps S26 and 27), the time t2 when the last arising edge of the wheel speed pulses detected in the step S24 is detected is stored in the time memory 2 (step S28).

The pulse counter is cleared in preparation for the start of the subsequent measurement (step S29), and the rotational angular velocity ω of the tire is calculated by the foregoing equation (2) using the time stored in the time memory 1 and the time stored in the time memory 2 (step S30).

The time memory 1 and the time memory 2 described in FIG. 10 are formed using storage areas in the RAM 26 shown in FIG. 4.

It is preferable that the detection processing of the rotational angular velocity ω described with reference to FIG. 8 or FIG. 10 is so performed that the rotational angular velocities of the four tires are simultaneously calculated in a parallel manner on the basis of the respective wheel speed pulses from the four wheel speed sensors 1. The reason for this is that the drop in the pneumatic pressure of the tire can be detected more accurately if the rotational angular velocities of the tires are that which are simultaneously detected because the tire whose pneumatic pressure relatively drops is detected on the basis of the rotational angular velocities of the tires.

Description is now made of a method of detecting a tire pressure drop.

Figure 11:
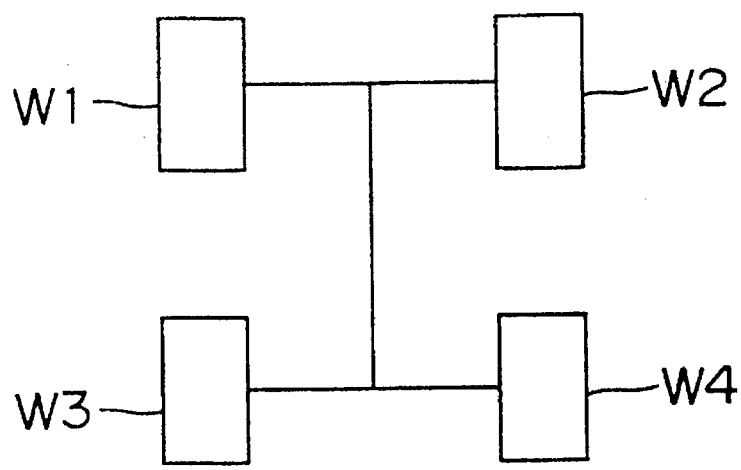
FIG. 11 is a diagram showing the arrangement of tires of a four-wheel vehicle.

In a diagram showing the arrangement of four tires of a four-wheel vehicle shown in FIG. 11, F1, F2, F3 and F4 are respectively taken as the rotational angular velocity of a left front tire W1, that of a right front tire W2, that of a left rear tire W3, and that of a right rear tire W4. At this time, the ratio dF of the sum of the rotational angular velocities (F1+F4) of the pair of tires W1 and W4 on a diagonal line to the sum of the rotational angular velocities (F2+F3) of the other pair of tires W2 and W3 on another diagonal line is found as a judged value, thus obtaining the following judging equation (3) for detecting a tire pressure drop:

$$dF=(F1+F4)/(F2+F3) \quad (3)$$

If all the pneumatic pressures of the four tires W1 to W4 are normal, F1 to F4 are all equal to each other, so that dF=1.

On the other hand, if the pneumatic pressure of any one of the tires drops, dF≠1. When holding the following expression, it is detectable that the pneumatic pressure of any one of the tires drops:

$$dF>(1+a_1), \text{ or } dF<(1-a_2)$$

where $a_1$ and $a_2$: constants

If the judging equation (3) is used, the rotational angular velocity of a reduced pressure tire out of the four tires can be detected as the amount of the change relative to the other three tires whose pneumatic pressures are normal. As described in the prior art, therefore, the reference amount for comparison does not include the rotational angular velocity of the reduced pressure tire, so that the detecting accuracy is not varied or degraded. This allows the detection to be conducted with high precision.

If the judging equation (3) according to the embodiment is used, it is possible to correctly detect the drop in the pneumatic pressure of any one of the four tires W1 to W4 or the drop in the pneumatic pressures of the two tires W1 and W4 or W2 and W3 on the diagonal line.

Description is now made of a method of specifying a tire whose pneumatic pressure drops out of the four tires W1 to W4 after detecting a tire pressure drop.

In the foregoing judging equation (3), it is possible to prescribe that:

the reduced pressure tire is W1 or W4 if dF>1, and the reduced pressure tire is W2 or W3 if dF<1.

Furthermore, in the above case, if the vehicle is linearly traveling, it is possible to prescribe that:

the reduced pressure tire is W1 if F1>F2, the reduced pressure tire is W2 if F1<F2, the reduced pressure tire is W3 if F3>F4, and the reduced pressure tire is W4 if F3<F4.

When the pneumatic pressures of the two tires which are not on the diagonal line, for example, the two front tires W1 and W2 or the two rear tires W3 and W4 simultaneously drop, the drop in the pneumatic pressures of the tires cannot, in some cases, be detected using the judging equation (3).

Under the conditions that the vehicle travels at approximately constant speed and substantially linearly after detecting a tire pressure drop using the judging equation (3), it is therefore preferable to compare the sum of the rotational angular velocities (F1+F2) of the front tires W1 and W2 and the sum of the rotational angular velocities (F3+F4) of the rear tires W3 and W4, and then if the sums are not equal, it is determined that the tires wherein the sum is larger have a drop in pneumatic pressures. That is, it is preferable to judge that:

the pneumatic pressures of the tires W1 and W2 drop if $(F1+F2)/(F3+F4)>C_0$ ($C_0$: a constant determined by the vehicle), and the pneumatic pressures of the tires W3 and W4 drop if $(F1+F2)/(F3+F4)<C_0$ ($C_0$: a constant determined by the vehicle).

Judgment as to whether or not the vehicle is traveling at constant speed may be made in the following manner. Specifically, if the rate of change in the average value of the rotational angular velocities of the four tires obtained from the four-wheel speed sensors is within a certain specified value, it can be judged that the vehicle is traveling at constant speed. On the other hand, if the rate of change is outside the certain specified value, for example, the rate of change rises above the specified value, it can be judged that the vehicle is being accelerated. Conversely, if the rate of change is lowered below the certain specified value, it can be judged that the vehicle is being decelerated. In the foregoing, on the basis of the outputs of the wheel speed sensors it is judged whether or not the vehicle is traveling at constant speed. It is therefore not necessity to provide an acceleration sensor or the like in the DWS, thus simplifying the construction of the DWS.

The detection of a tire pressure drop using the judging equation (3) is, as mentioned above, based on the ground that if the rolling radius of the tire varies, the rotational angular velocity of the tire whose rolling radius varies is changed with the rotational angular velocities of the other tires.

However, the rolling radius of the tire varies depending on not only (1) the change in the tire pressure, but also (2) the load on the tire, (3) the rotation speed of the tire, (4) the slip angle of the tire, (5) the camber angle of the tire, (6) whether the vehicle is being accelerated or braked, (7) whether the vehicle is cornering, (8) the wear of the tire, and the like, as described above.

In order to accurately detect a tire pressure drop, therefore, it is necessary to inhibit the tire pressure drop under particular conditions or correct the calculated rotational angular velocity of the tire so as to remove the variation in the rolling radius depending on the foregoing items (2) to (8).

Description is now made sequentially of a case where the detection is inhibited and a case where the calculated rotational angular velocity is corrected.

When detection of tire pressure drop is inhibited:

There are the following cases (1) to (6).

(1) When the vehicle is traveling at significantly low speed, a sufficient AC voltage signal $e_i$ for binarizating is not obtained from the wheel speed sensor 1 shown in FIG. 3. Consequently, the output of the wheel speed sensor 1 may not, in some cases, be correctly binarized.

If the speed of the vehicle is not more than a predetermined speed, therefore, the detection of the wheel speed pulses is inhibited.

As a specific method of inhibiting the detection of the wheel speed pulses, the detection of a tire pressure drop is inhibited if the number of pulses counted is less than a predetermined specified value in the measuring period $\Delta t$ described in FIG. 7, for example.

More preferably, if there is a rapid increase or decrease between the number of pulses in a certain measuring period $\Delta t$ and the number of pulses in the succeeding measuring period $\Delta t$, the detection of the tire pressure drop is inhibited. This is because it is considered that the rapid increase or decrease of the number of pulses in a predetermined measuring period $\Delta t$ is due to a slip of the tire or the like. If such data is used, there is a high probability that erroneous judgment will be made.

More preferably in the above case, the generating period of the wheel speed pulses applied is monitored, to inhibit the detection of the tire pressure drop based on the number of wheel speed pulses within the measuring period $\Delta t$ including the pulses if the generating period of the wheel speed pulses exceeds a specified value. This is because the case where the generating period of the wheel speed pulses exceeds a specified value results from a slip of the tire or the like.

(2) When the vehicle is being accelerated, the tire may slip in some cases, which is a factor of erroneous detection. Therefore, the ratio of the rotational angular velocities of a driving wheel and a driven wheel, for example, a front wheel and a rear wheel of the vehicle is found, to inhibit the detection if the value of the ratio exceeds a specified value. In this case, the ratio of the rotational angular velocity of the driving wheel to the rotational angular velocity of the driven wheel may be found using the average value of the rotational angular velocities of the two front tires being driving wheels and the average value of the rotational angular velocities of the two rear tires being driven wheels.

(3) While the vehicle is turning a sharp curve, the tire skids, for example, which is a factor of erroneous detection. The radius of curvature R of a road on which the vehicle is traveling is estimated by the following equation (4), to inhibit the detection when the value R is below a specified value:

$$\frac{1}{R} = A \left| \frac{(F1+F3)-(F2+F4)}{F1+F2+F3+F4} \right| \quad (4)$$

where

F1, F2, F3, F4: the rotational angular velocities of the left front tire, the right front tire, the left rear tire and the right rear tire, A: a constant determined by the vehicle Specifically, when the road on which the vehicle is traveling makes a curve having a small radius of curvature such as a hairpin curve or a spoon curve, the detection of the tire pressure drop is inhibited.

(4) While the vehicle is cornering, large lateral acceleration G is applied when the speed of the vehicle is high or the cornering diameter is small, so that the tire pressure drop may, in some cases, be erroneously detected due to a slip of the tire or the like. Therefore, the lateral acceleration G produced in the vehicle is estimated by the following equation (5), to inhibit the detection when the value of G exceeds a specified value:

$$G=B|\{(F1+F3)-(F2+F4)\}(F1+F2+F3+F4)| \quad (5)$$

where

F1, F2, F3, F4: the rotational angular velocities of the left front tire, the right front tire, the left rear tire and the right rear tire, B: a constant determined by the vehicle A gravity sensor may be mounted on the vehicle to detect the lateral acceleration G produced in the vehicle by the gravity sensor instead of estimating the lateral acceleration G produced in the vehicle on the basis of the equation (5).

(5) When the vehicle is changed from a linearly traveling state to a cornering state or from a cornering state to a linearly traveling state, that is, at the beginning or the end of cornering, the behavior of the vehicle enters a transient state. Therefore, the movement of the load in the vehicle, for example, is unfixed, which is a factor of erroneous detection of the tire pressure drop. At the beginning and the end of cornering at which the behavior of the vehicle enters a transient state, the detection is inhibited. Judgment as to whether or not the detection is inhibited is made on the basis of the rate of change of the value of the lateral acceleration G produced in the vehicle (this value may be a value estimated by the equation (5) or a value measured by the gravity sensor). If the rate of change exceeds a specified value, the detection is inhibited.

(6) While the ABS, a parking brake, a traction control device or the like provided for the vehicle is being operated, the wheels are not normally rotated. This may cause a slip of the tire in some cases, resulting in a factor of erroneous detection for the DWS. Therefore, the ABS, the parking brake and the traction control device are respectively connected to the DWS by signal lines. When the ABS, the parking brake or the traction control device is being operated, a signal informing of its operation is applied to the DWS. If the signal informing of the operation of any one of the ABS, the parking brake and the traction control device is applied to the DWS, the detection processing is not performed in the DWS.

The specified value being the basis of judgment as to whether or not the detection in each of the items (1) to (5) is inhibited is predetermined and is stored in the non-volatile memory 27 (see FIG. 4). Consequently, the CPU 24 reads out the specified value stored in the non-volatile memory 27, to determine whether detection processing of the tire pressure drop is performed or inhibited by comparing the lateral acceleration G with the specified value.

When rotational angular velocity is corrected:

There are the following cases (1) and (2).

(1) As described above, the rolling radius of the tire is changed depending on not only the change in the pneumatic pressure of the tire but also the travel speed of the vehicle.

In order to accurately extract the relationship between the rolling radius and the pneumatic pressure of the tire, therefore, it is necessary to previously find the amount of the variation of the rolling radius of the tire depending on the travel speed of the vehicle for each travel speed, correct the amount of the variation at the time of detection processing of the tire pressure drop and consequently, correct the rotational angular velocity of the tire.

If $\Delta r$ is taken as the amount of the variation of the rolling radius of the tire with respect to the travel speed of the vehicle, the following equation holds:

$$\Delta r = f(v)$$

where f: a function determined by the vehicle v: the travel speed of the vehicle, which can be replaced with the average of the rotational angular velocities of the four tires If $r_0$ is taken as the radius at the time of the tire stopping, whose pneumatic pressure is normal, the change in the rolling radius of the tire is as follows:

$$(r_0 + \Delta r)/r_0 = 1 + \Delta r/r_0$$
$$= 1 + f(v)/r_0 = 1 + Cf(v)$$

where C: a constant

If Fx (Fx=F1, F2, F3 or F4) is taken as the rotational angular velocity of the tire, therefore, the following relationship holds:

$$Fx \propto (1/r_0)$$

The following is the actual rotational angular velocity of the tire:

$$Fx' \propto \frac{1}{r_0(1 + Cf(v))}$$

Accordingly, the rotational angular velocity Fx is corrected as follows:

$$Fx = \{1 + Cf(v)\}Fx'$$

Alternatively, the rates of change in the rotational angular velocity of the tire may be previously measured for each typical speed of the vehicle, for example, 50 Km/h, 100 Km/h and 150 Km/h and stored in the form of a table in the non-volatile memory 27 or the ROM 25 as the amounts of correction for correcting the detected rotational angular velocity. Any one of the rates of change may be read out from the non-volatile memory 27 depending on the travel speed of the vehicle to correct the detected rotational angular velocity.

(2) While the vehicle is cornering, the rolling radius of the tire varies depending on the lateral acceleration G produced in the vehicle. While the vehicle is cornering, therefore, the rotational angular velocity varies depending on the variation in the rolling radius of the tire, so that the rotational angular velocity must be corrected.

Figure 12:
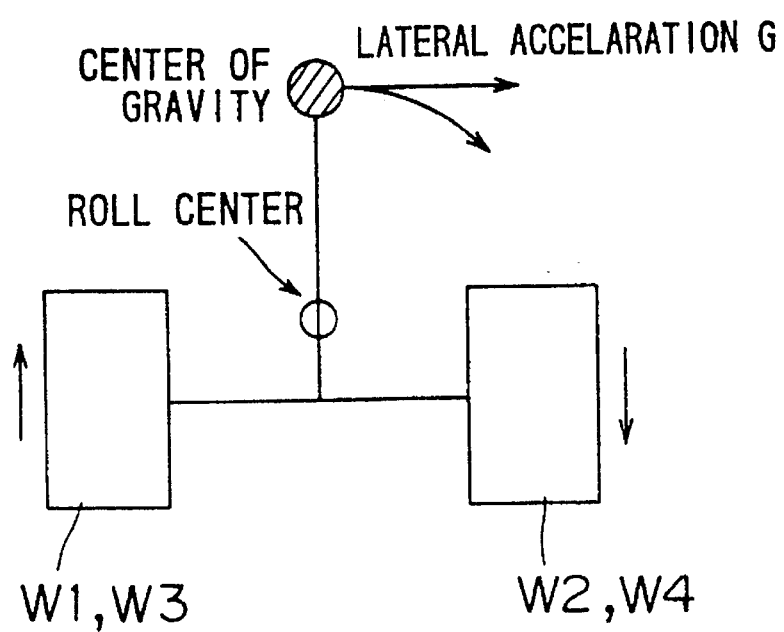
FIG. 12 is an illustration for explaining a force exerted on each of tires in a case where lateral acceleration G is exerted on the vehicle.

Meanwhile, it can be judged in the following manner on the basis of the outputs of the wheel speed sensors whether the vehicle is linearly traveling or is cornering. Specifically, when both the difference or the ratio of the left and right front tires W1 and W2 and the difference or the ratio of the left and right rear tires W3 and W4 exceeds a certain specified value, it can be judged that the vehicle is cornering. In the other cases, it can be judged that the vehicle is linearly traveling. If it is judged that the vehicle is cornering, the following correction is made. Thus, if it is judged whether or not the vehicle is linearly traveling or is cornering on the basis of the outputs of the wheel speed sensors, there is no need to provide a steering angle sensor in this DWS, enabling to make the DWS in lower-cost and simpler construction. In FIG. 12, if the traverse gravity G is applied to the vehicle, the angular moment is generated around the roll center in the vehicle, so that a force proportional thereto is exerted on each of the tires W1, W2, W3 and W4. The rolling radius of the tire is affected by the load as described above, and varies in proportion to the load. While the vehicle is cornering, therefore, the amount of the variation of the rolling radius can be represented by a function of the lateral acceleration G. If $\Delta r$ is taken as the amount of the variation and $r_0$ is taken as the initial radius of the tire, the amount of change in the rolling radius of the tire is as follows:

$$(r_0 + \Delta r)/r_0 = 1 + \Delta r/r_0 = 1 + f(G)$$

where f: a function determined by the vehicle, which is determined for each tire While the vehicle is cornering, therefore, if Fx (Fx=F1, F2, F3 or F4) is taken as the rotational angular velocity of each of the tires, the rotational angular velocity can be corrected by setting Fx'=Fx (1+f (G)).

The above described correction factor f (G) may be represented as a continuous function, or $\Delta r/r_0$ measured for each typical value of G may be stored as the correction factor f (G) in the form of a table in the non-volatile memory 27.

If the rotational angular velocities of the tires thus calculated are corrected, the tire pressure drop can be detected using the corrected rotational angular velocities of the tires, regardless of whether the rotational angular velocities of the tires are detected while the vehicle is being accelerated or decelerated or while the vehicle is cornering. Accordingly, it is possible to reduce a state where the tire pressure drop cannot be detected, thus avoiding a state where the tire pressure drop cannot be detected for a long time period depending on the conditions of the road, for example.

Description is now made of control for judgment of a reduced pressure tire which is carried out by the CPU 24 shown in FIG. 4 referring to a flow chart.

Figure 13:
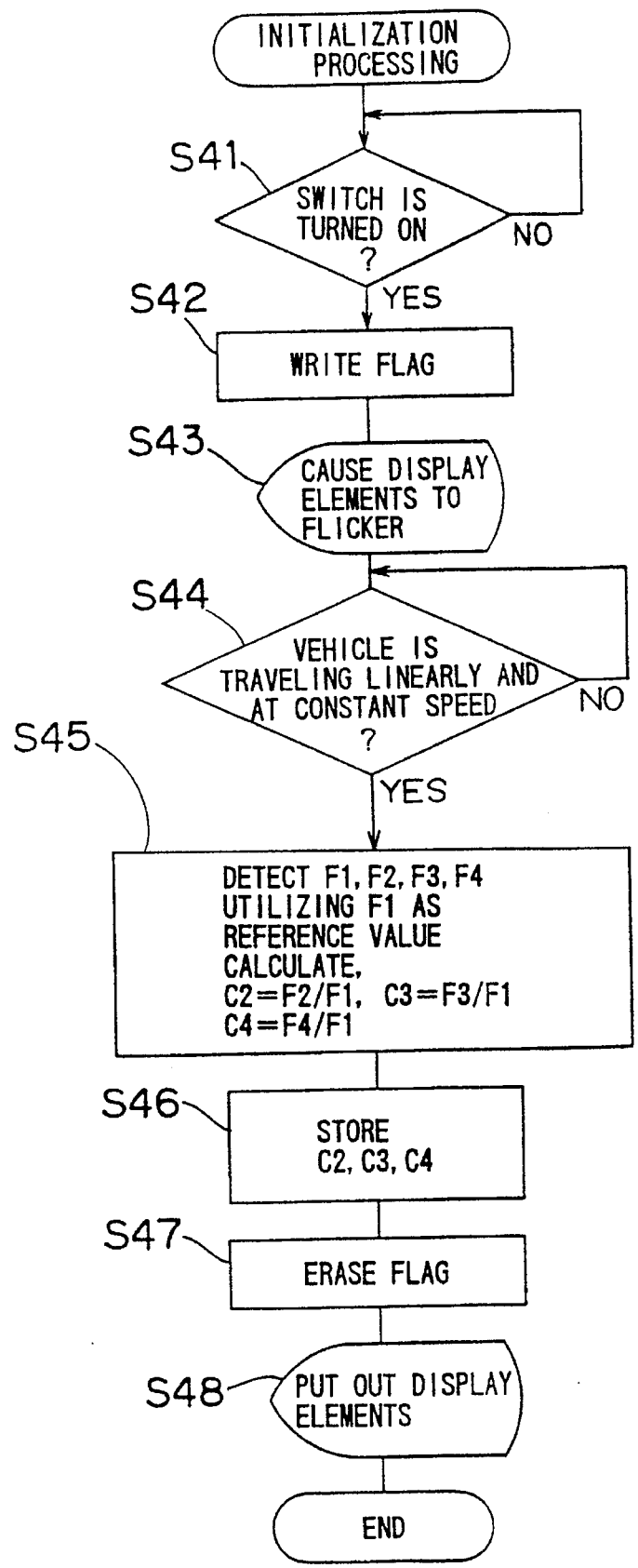
FIG. 13 is a flow chart showing an initialization processing required before judgment processing of a reduced pressure tire.

FIG. 13 is a flow chart showing an initialization processing required before judgment processing of a reduced pressure tire. The initialization processing is that which required from the following reasons.

Even if the pneumatic pressures of the four tires W1, W2, W3 and W4 of the vehicle are all normal, the rolling radii of the four tires are not necessarily the same depending on the difference between loads on the respective tires due to the weight distribution of the vehicle, the wear of the tires, the variation in the manufacture of the tires, and the like. For the subsequent accurate detection of the tire pressure drop, therefore, it is essential to correct the initial variation of the rolling radii of the four tires by initialization.

Referring to FIG. 13, the initialization processing is started on receipt of the operation of the initialization switch 15 (see FIGS. 1 and 4) (step S41).

If it is judged that the initialization switch 15 is turned on, the CPU 24 writes an initialization flag in the non-volatile memory 27 (step S42). The reason why the initialization flag is written in the non-volatile memory 27 is that a correction factor may, in some cases, be incorrectly found if the power supply of the DWS is turned off during the initialization processing. If this incorrect correction factor is used, the DWS may perform erroneous detection. Therefore, an attempt is made to ensure the contents of the non-volatile memory 27 by writing the initialization flag in the non-volatile memory 27.

The display elements W1 to W4 of the four tires in the display 22 (see FIG. 4) are then caused to flicker to inform a driver that the initialization processing is being performed (step S43).

After the initialization switch 15 is depressed, the vehicle travels linearly and at constant speed by the driver. The CPU 24 judges whether or not the vehicle is traveling linearly and at constant speed on the basis of the wheel speed pulses from the wheel speed sensors (step S44). As described above, it is judged that the vehicle is traveling linearly when both the difference or the ratio of the rotational angular velocities of the left and right front tires W1 and W2 and the difference or the ratio of the rotational angular velocities of the left and right rear tires W3 and W4 do not exceed a certain specified value.

Furthermore, it is judged that the vehicle is traveling at constant speed if the rate of change in the average value of the wheel speed pulses applied from the four wheel speed sensors is within a certain specified value.

In this case, the rotational angular velocities F1, F2, F3 and F4 of the four tires are detected. In addition, the rotational angular velocity of one arbitrary tire, for example, F1 is taken as a reference value, the ratios of the rotational angular velocities of the other tires to the reference value F1 are respectively found and are taken as correction factors with respect to the respective tires. Specifically, a correction factor C2 shall be F2/F1 with respect to the tire W2, a correction factor C3 shall be F3/F1 with respect to the tire W3, and a correction factor C4 shall be F4/F1 with respect to the tire W4 (step S45).

The found correction factors C2, C3 and C4 are stored in the non-volatile memory 27 (step S46). On the other hand, the initialization flag written in the non-volatile memory 27 is erased (step S47), and the tire indicator lamps of the display 22 are put out (step S48), so that this processing is terminated.

When the DWS is operated after the initialization processing is terminated, that is, when the ignition key of the vehicle is turned on, the CPU 24 judges whether or not the initialization flag is written in the non-volatile memory 27. If the initialization flag is written, a request to perform initialization processing again is displayed on the display 22, for example. Alternatively, the request may be reported by a buzzer or the like.

Figure 14:
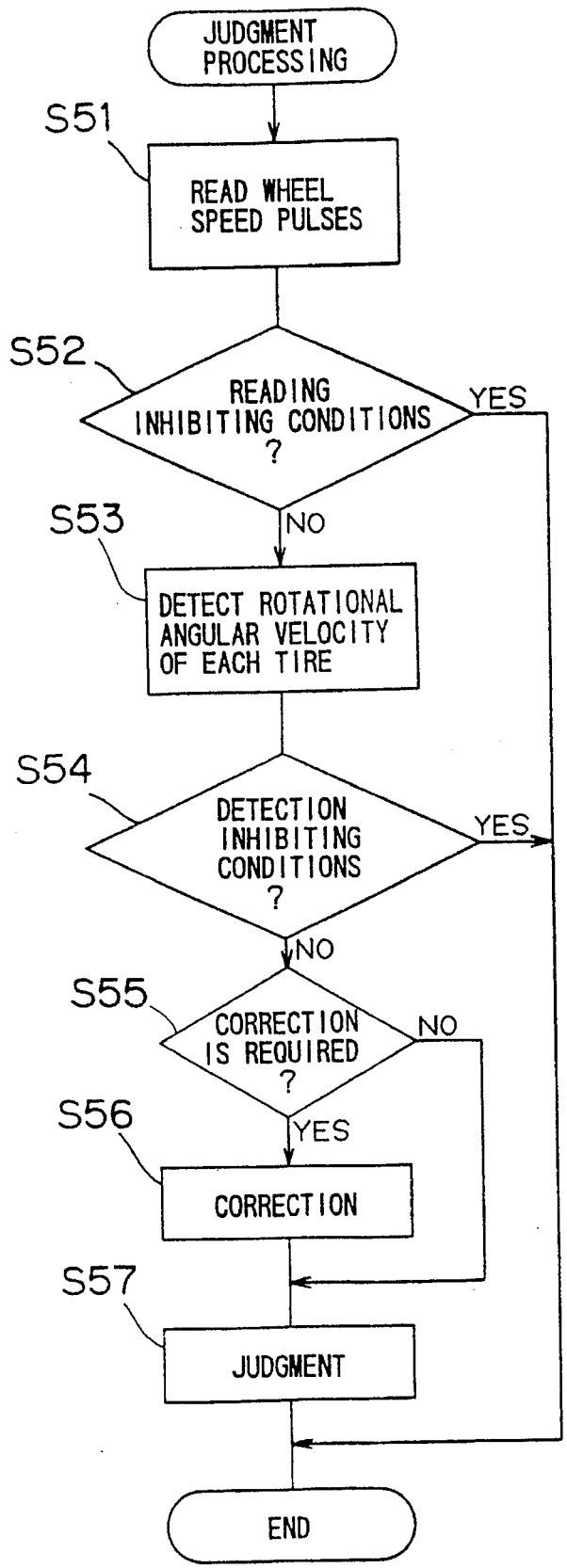
FIG. 14 is a flow chart showing the judgment processing of a reduced pressure tire.
Figure 15:
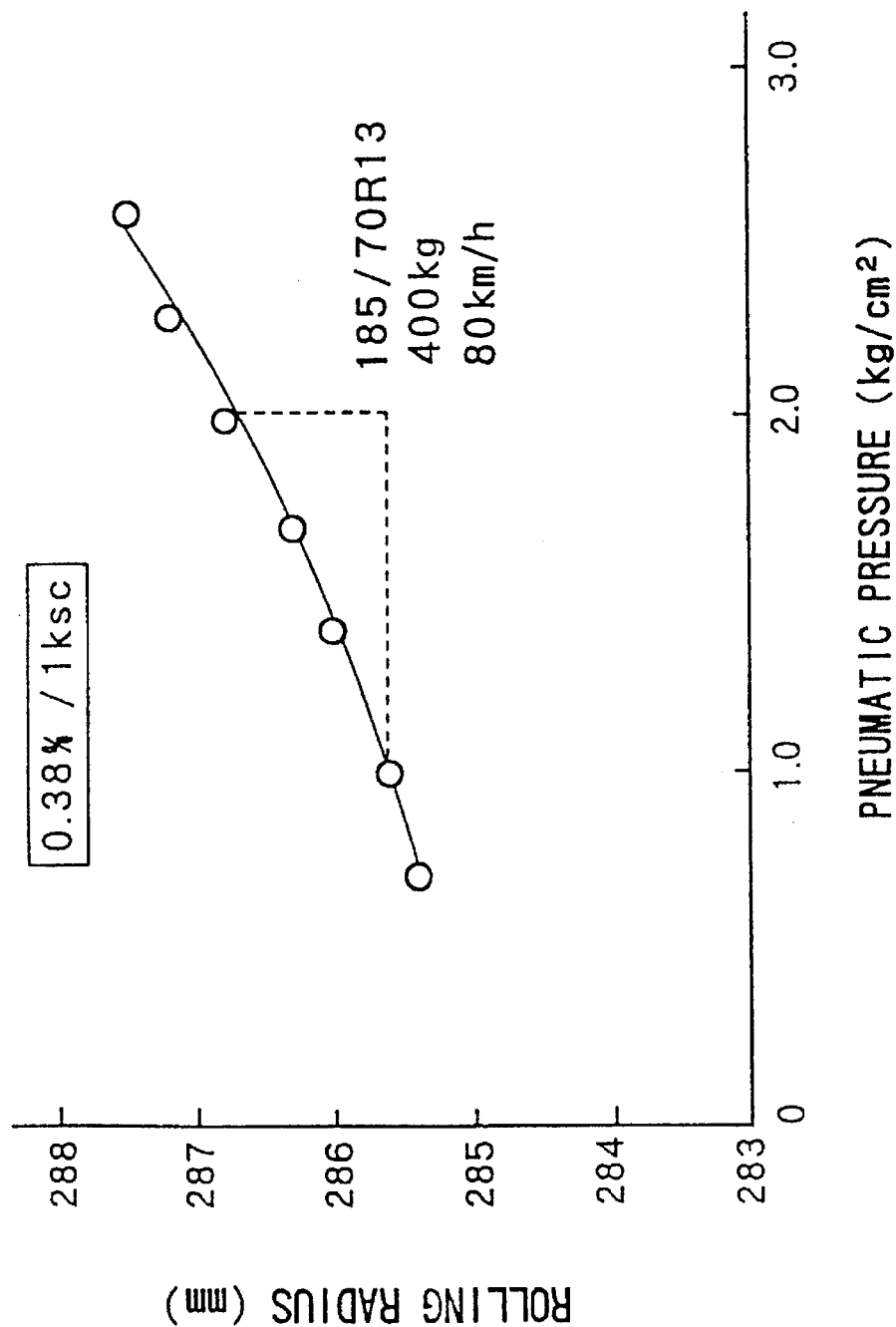
FIG. 15 is a graph showing the effect of the pneumatic pressure on the rolling radius of a tire.
Figure 16:
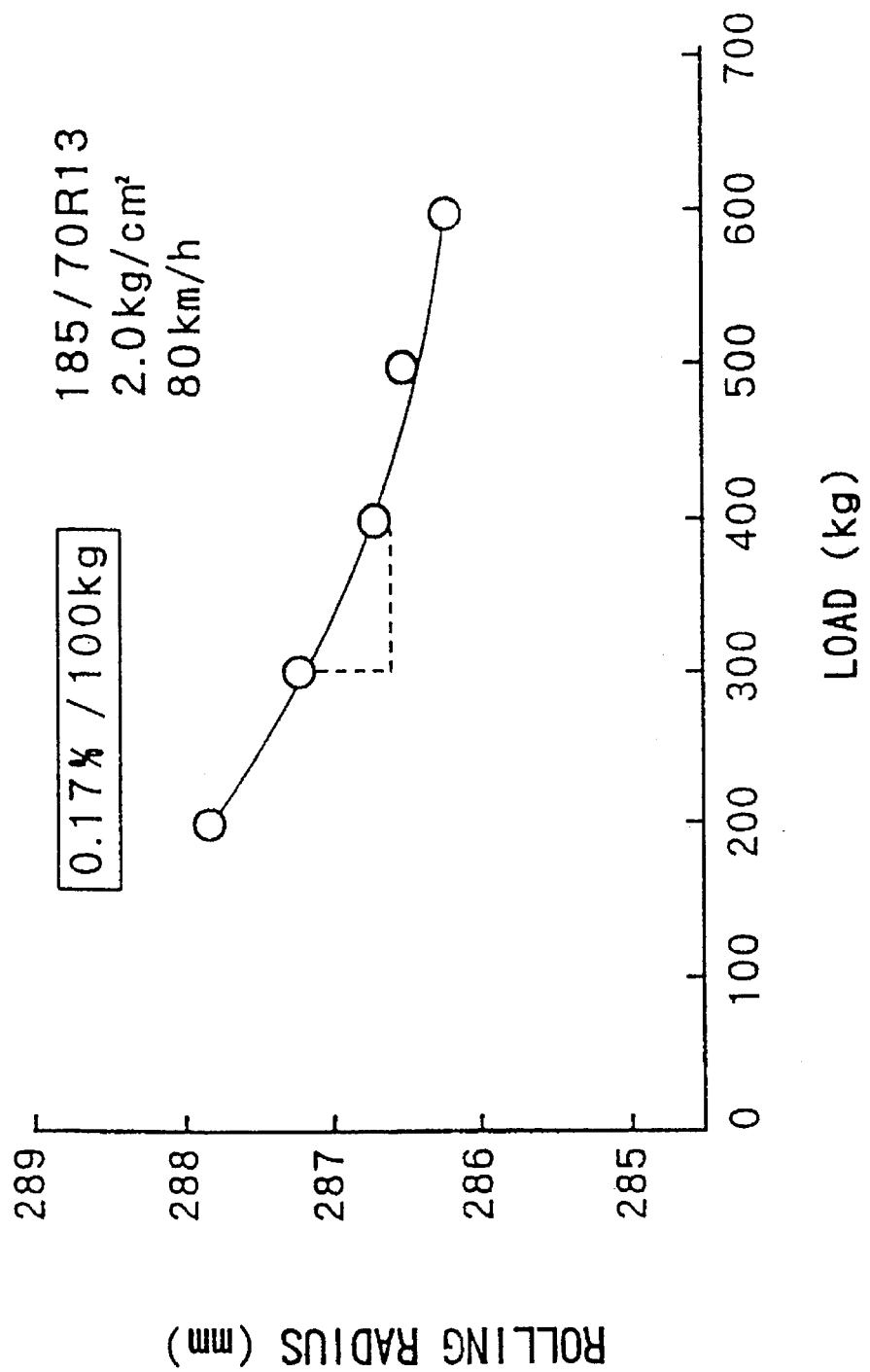
FIG. 16 is a graph showing the effect of the load on the rolling radius of a tire.
Figure 17:
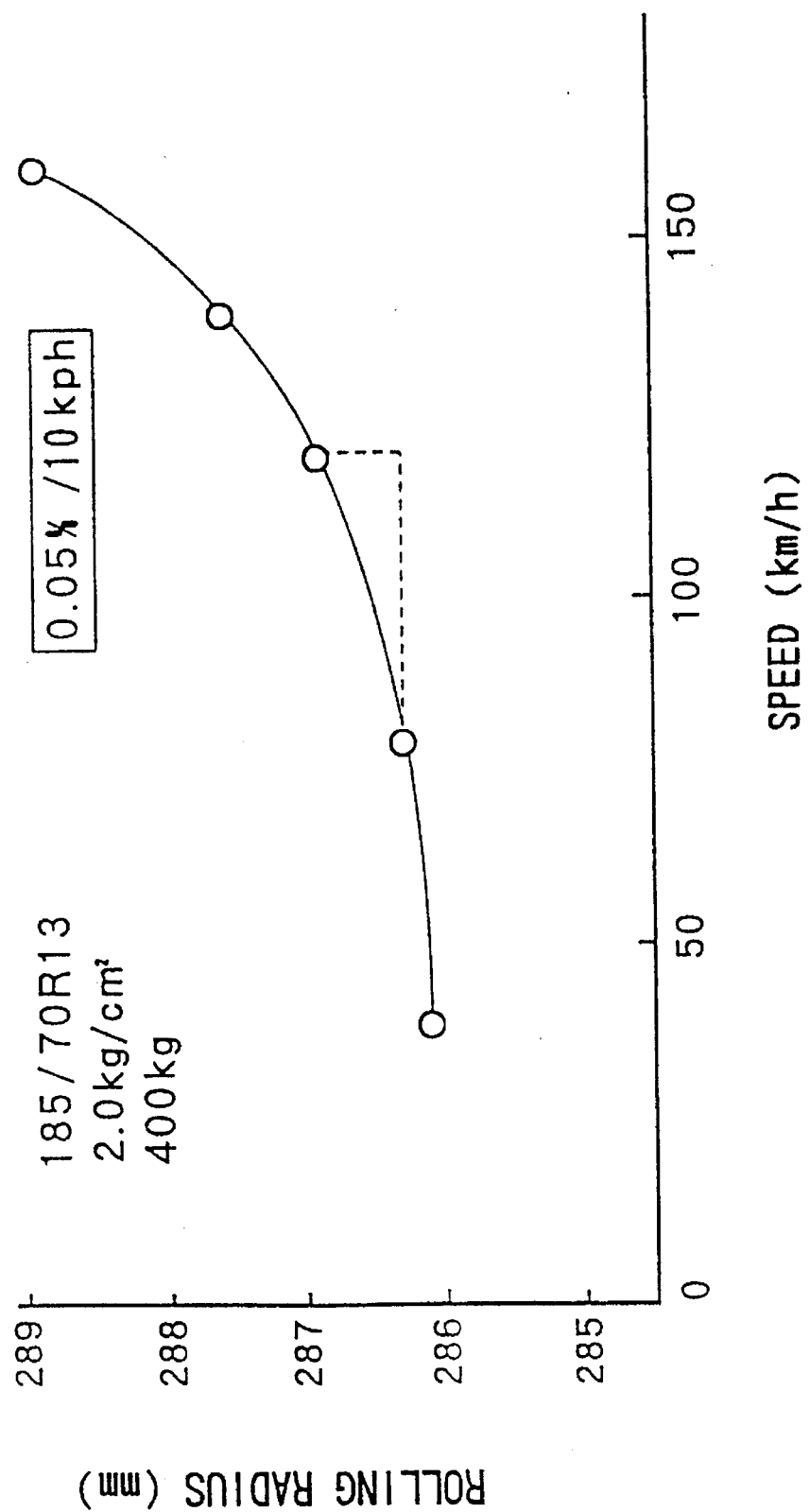
FIG. 17 is a graph showing the effect of the speed on the rolling radius of a tire.
Figure 18:
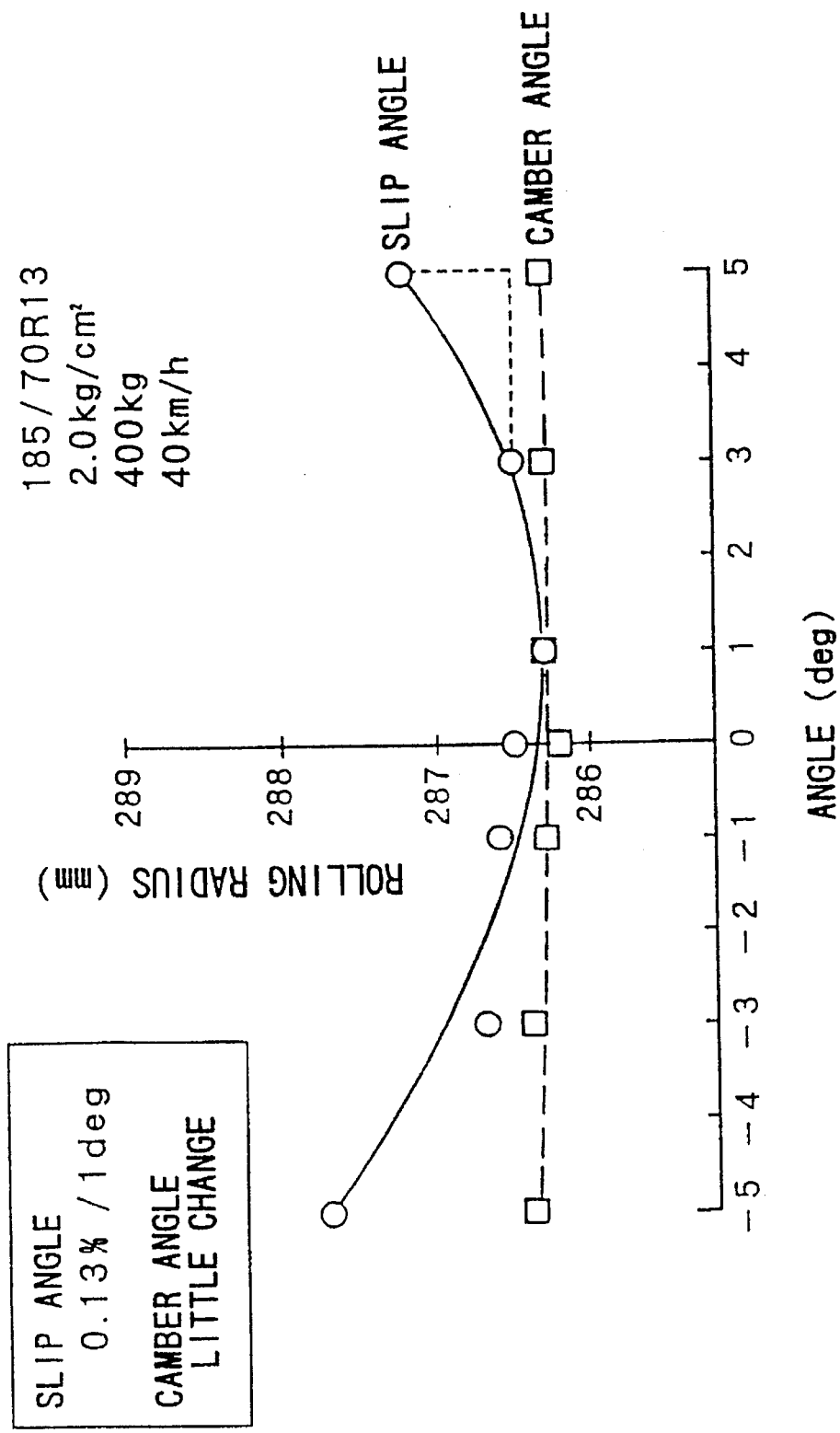
FIG. 18 is a diagram showing the effect of the slip angle and the camber angle on the rolling radius of a tire.
Figure 19:
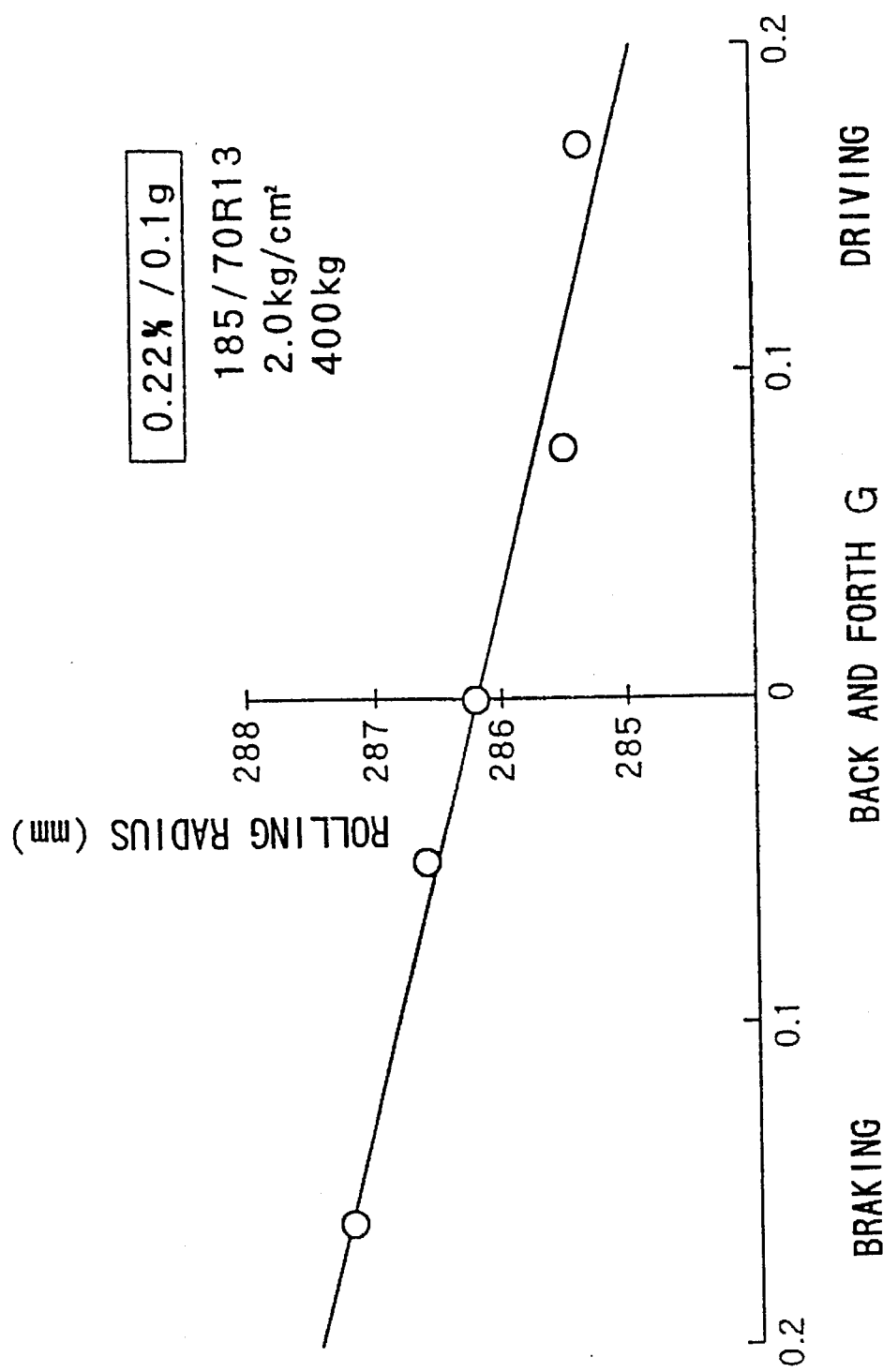
FIG. 19 is a graph showing the effect of driving or braking of a vehicle on the rolling radius of a tire.
Figure 20:
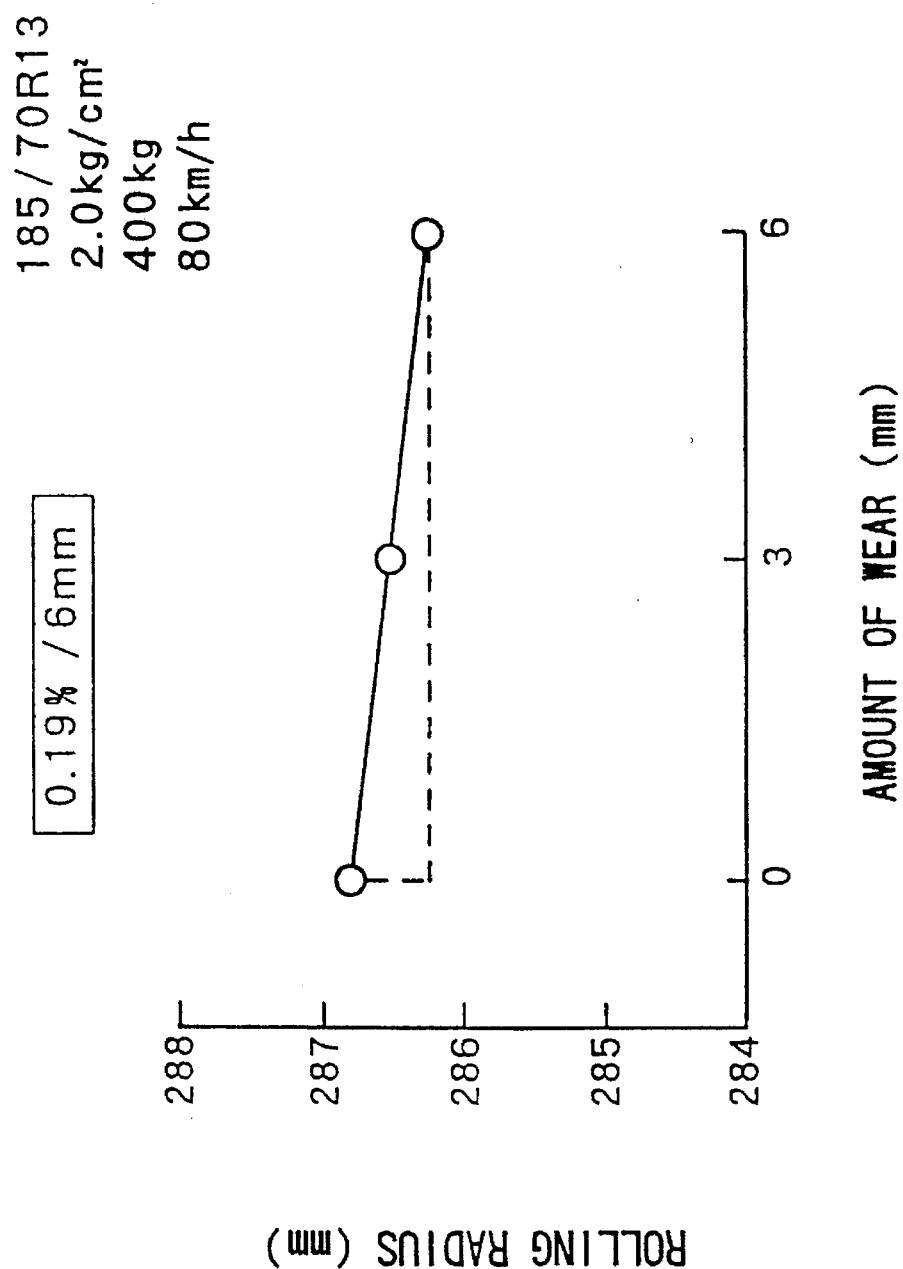
FIG. 20 is a graph showing the relationship between the rolling radius of a tire and the wear of the tire.

Description is now made of judgment processing of a reduced pressure tire with reference to a flow chart of FIG. 14.

First, the wheel speed pulses applied from the binarizating circuit 14 in the control unit for ABS 6 described in FIG. 4 are read (step S51). It is judged whether or not the read wheel speed pulses meet pulse reading inhibiting conditions (the above case (1) where the detection of the tire pressure drop is inhibited) (step S52). If the wheel speed pulses meet the pulse reading inhibiting conditions, the subsequent processing is not performed.

If the wheel speed pulses do not meet the pulse reading inhibiting conditions, the rotational angular velocities F1, F2, F3 and F4 of the respective tires are calculated (step S53). It is judged, on the basis of the calculated rotational angular velocities F1 to F4, whether or not the vehicle is in the detection inhibiting conditions (the cases (2) to (6) where the detection of the tire pressure drop is inhibited) (step S54). If the vehicle is in the detection inhibiting conditions, the subsequent processing is not performed.

If the vehicle is not in the detection inhibiting conditions, it is further judged whether or not the rotational angular velocities F1 to F4 must be corrected (step S55). The correction varies depending on the travel speed of the vehicle and whether or not the vehicle is cornering, as described above. If the correction is required, the calculated rotational angular velocities F1 to F4 of the respective tires are corrected (step S56).

Using the corrected rotational angular velocities F1 to F4, on the basis of the judging equation (3) for finding the ratio dF of the sum of the rotational angular velocities, for example, (F1+F4) of a pair of tires on a diagonal line to the sum of the rotational angular velocities (F2+F3) of the other pair of tires on another diagonal line, it is judged whether the reduced pressure tires exists or not, as mentioned above, and a tire whose pneumatic pressure drops is specified (step 57).

Although in the embodiment, the rotational angular velocities of the tires W1 to W4 are calculated utilizing the output pulses of the wheel speed sensors 1 provided for the ABS, a wheel speed sensor for DWS may be mounted on a vehicle provided with no ABS.

INDUSTRIAL APPLICABILITY

As described in the foregoing, a device for and a method of detecting a tire pressure drop in the present invention are useful in detecting a tire pressure drop for a four-wheel vehicle. In the case, the tire pressure drop can be detected with high precision in the present invention.

What is claimed:

1. A tire-pressure drop detecting device for a four-wheel vehicle having four tires, comprising:

rotational angular velocity detecting means for each tire, each rotational angular velocity detecting means including pulse outputting means respectively provided in relation to a corresponding tire for outputting pulses at a rate proportional to the speed of rotation of the corresponding tire, counting means connected to the pulse outputting means for counting the pulses applied from the pulse outputting means within a predetermined measuring period, storing means for storing the time when the last pulse within each of the measuring periods is applied to the counting means, means for calculating the time elapsed from the time when the last pulse in the preceding measuring period is applied to the time when the last pulse in the present measuring period is applied, which calculated time is stored in the storing means as a reference time of the present measuring period, means for dividing the number of pulses applied within the present measuring period by said reference time, to calculate a number of pulses per unit time, and means for calculating the rotational angular velocity of the corresponding tire on the basis of said calculated number of pulses per unit time;

vehicle state judging means for judging whether or not said four-wheel vehicle is in a state previously determined to be unsuitable for detection of a tire pressure reduction;

operating means for
not performing an operation if said vehicle state judging means judges that the four-wheel vehicle is in a state previously determined to be unsuitable for the detection, and finding, from the rotational angular velocities of the four tires detected by said rotational angular velocity detecting means, the ratio of the sum of the rotational angular velocities of a first pair of tires to the sum of the rotational angular velocities of a second pair of tires, the first pair of tires being spatially arranged on a diagonal line relative to the four tires of the vehicle, if said vehicle state judging means does not judge that the four-wheel vehicle is in a state previously determined to be unsuitable for the detection; and reduced pressure tire judging means for judging that the pneumatic pressure of a tire is reduced depending on whether the ratio found by said operating means is larger or smaller than a predetermined value.

2. A tire pressure drop detecting device according to claim 1, further comprising display means for displaying the results of the judgment by said reduced pressure tire judging means.

3. A tire pressure drop detecting device according to claim 2, wherein said display means comprises display elements corresponding to the four tires, such that the display element corresponding to a tire whose pneumatic pressure is judged to be reduced lights up or flickers, and all the display elements light up for a predetermined time period after an ignition switch of the vehicle is turned on.

4. A tire pressure drop detecting device according to claims 1, 2 or 3, wherein a state previously determined to be unsuitable for the detection of a tire pressure reduction includes any of:

(1) a state where the four-wheel vehicle is traveling at a low speed of not more than a predetermined speed, (2) a state where the four-wheel vehicle is being accelerated or decelerated at not less than a predetermined rate, (3) a state where the four-wheel vehicle is cornering at a smaller radius than a predetermined radius of curvature, (4) a state where lateral acceleration of not less than a predetermined value is produced in the four-wheel vehicle, (5) a state where
the four-wheel vehicle is changed from a linearly traveling condition to a cornering condition, or from a cornering condition to a linearly traveling condition, and
the rate of change in the lateral acceleration produced by the change in traveling conditions exceeds a predetermined specified value, and (6) a state where a device provided for the four-wheel vehicle, which device renders the tires unsuitable for the detection of a tire pressure reduction, is being operated.

5. A tire pressure drop detecting device for a four-wheel vehicle having four tires, comprising:

rotational angular velocity detecting means for each tire, each rotational-angular velocity detecting means including
pulse outputting means provided in relation to a corresponding tire for outputting pulses at a rate proportional to the speed of rotation of the corresponding tire,
counting means connected to the pulse outputting means for counting the pulses applied from the pulse outputting means within a predetermined measuring period,
first storing means for storing the time when the last pulse within each of the measuring periods is applied to the counting means,
means for calculating the time elapsed from the time when the last pulse in the preceding measuring period is applied to the time when the last pulse in the present measuring period is applied, which calculated time is stored in the first storing means as a reference time of the present measuring period,
means for dividing the number of pulses applied within the present measuring period by said reference time, to calculate a number of pulses per unit time, and
means for calculating the rotational angular velocity of the corresponding tire on the basis of said calculated number of pulses per unit time;

correcting means for correcting the rotational angular velocity of each of the-tires detected by the rotational angular velocity detecting means based upon the behavior of said four-wheel vehicle;

operating means for finding the ratio of the sum of the rotational angular velocities of a first pair of tires to the sum of the rotational angular velocities of a second pair of tires on a the basis of the rotational angular velocities of the respective tires corrected by said correcting means, the first pair of tires being spatially arranged on a diagonal line relative to the four tires of the vehicle; and reduced pressure tire judging means for judging that the pneumatic pressure of a tire is reduced based upon whether the ratio found by said operating means is larger or smaller than a predetermined value.

6. A tire pressure drop detecting device according to claim 5, wherein said correcting means corrects the detected rotational angular velocities of the respective tires depending on the travel speed of the four-wheel vehicle.

7. A tire pressure drop detecting device according to claim 6, wherein said correcting means corrects the detected rotational angular velocities of the respective tires when the four-wheel vehicle is cornering.

8. A tire pressure drop detecting device according to claim 5, wherein said correcting means corrects the detected rotational angular velocities of the respective tires when the four-wheel vehicle is cornering.

9. A tire pressure drop detecting device according to claim 5, wherein said correcting means finds an amount of variation in a rolling radius of each tire due to the effect of a travel speed of the vehicle on the basis of a predetermined function representing a relationship between the travel speed of the vehicle and the amount of variation in the rolling radius, so as to correct the rotational angular velocities of the tires on the basis of the found amount of the variation in the rolling radius.

10. A tire pressure drop detecting device according to claim 5, wherein said correcting means comprises second storing means for storing a table representing a relationship between a travel speed of the vehicle and an amount of variation in a rolling radius of each tire, the contents stored in the second storing means being readable to find the amount of variation in the rolling radius of each tire due to the travel speed of the vehicle, for correcting the rotational angular velocities of the respective tires on the basis of the found amount of variation in the rolling radius of each tire.

11. A tire pressure drop detecting device according to claim 5, wherein said correcting means judges that the vehicle is cornering when the difference or the ratio of the rotational angular velocities of the left and right front tires exceeds a specified value, or the difference or the ratio of the rotational angular velocities of the left and right rear tires exceeds a specified value, for correcting the rotational angular velocities of the tires on the basis of a lateral acceleration calculated from the rotational angular velocities of the tires.

12. A tire pressure drop detecting device according to any one of claims 5 to 11, further comprising vehicle state judging means for judging whether or not said four-wheel vehicle is in a state previously determined to be unsuitable for detection of a tire pressure reduction, said operating means not finding the sum of the rotational angular velocities when said vehicle state judging means judges that the four-wheel vehicle is in a state previously determined to be unsuitable for the detection.

13. A tire pressure drop detecting device according to claim 12, wherein a state previously determined to be unsuitable for the detection of a tire pressure reduction includes any of:

(1) a state where the four-wheel vehicle is traveling at a low speed of not more than a predetermined speed, (2) a state where the four-wheel vehicle is being accelerated or decelerated at not less than a predetermined rate, (3) a state where the four-wheel vehicle is cornering at a smaller radius than a predetermined radius of curvature, (4) a state where lateral acceleration of not less than a predetermined value is produced in the four-wheel vehicle, (5) a state where the four-wheel vehicle is changed from a linearly traveling condition to a cornering condition, or from a cornering condition to a linearly traveling condition, and the rate of change in the lateral acceleration produced by the change in traveling conditions exceeds a predetermined specified value, and (6) a state where a device provided for the four-wheel vehicle, which device renders the tires unsuitable for the detection of a tire pressure reduction, is being operated.

14. A tire pressure drop detecting device according to claim 5, wherein said correcting means judges that the vehicle is cornering when the difference or the ratio of the rotational angular velocities of the left and right front tires exceeds a specified value, and the difference or the ratio of the rotational angular velocities of the left and right rear tires exceeds a specified value, for correcting the rotational angular velocities of the tires on the basis of a lateral acceleration calculated from the rotational angular velocities of the tires.

15. A tire pressure drop detecting device for a four-wheel vehicle having four tires, comprising:

rotational angular velocity detecting means for each tire, for respectively detecting the rotational angular velocity F1 of a left front tire W1, the rotational angular velocity F2 of a right front tire W2, the rotational angular velocity F3 of a left rear tire W3 and the rotational angular velocity F4 of a right rear tire W4 of the four-wheel vehicle, each rotational angular velocity detecting means including pulse outputting means provided in relation to a corresponding tire for outputting pulses at a rate proportional to the speed of rotation of the corresponding tire, counting means connected to the pulse outputting means for counting the pulses applied from the pulse outputting means within a predetermined measuring period, storing means for storing the time when the last pulse within each of the measuring periods is applied to the counting means, means for calculating the time elapsed from the time when the last pulse in the preceding measuring period is applied to the time when the last pulse in the present measuring period is applied, which calculated time is stored in the storing means as a reference time of the present measuring period, means for dividing the number of pulses applied within the present measuring period by said reference time, to calculate a number of pulses per unit time, and means for calculating the rotational angular velocity of the corresponding tire on the basis of said calculated number of pulses per unit time;

operating means for finding, from the detected rotational angular velocities of the respective tires, a ratio dF of the sum of the rotational angular velocities (F1+F4) to the sum of the rotational angular velocities (F2+F3); and reduced pressure tire judging means for judging that there is no tire whose pneumatic pressure is reduced if the ratio dF found by said operating means is in the range of $(1+a_1)$ to $(1-a_2)$, where $a_1$ and $a_2$ are constants determined by the vehicle, and judging that there is a tire whose pneumatic pressure is reduced if said ratio dF is not within said range.

16. A tire pressure drop detecting device according to claim 15, further comprising means for prescribing that the reduced pressure tire is the left front tire W1 or the right rear tire W4 if dF>1, and the reduced pressure tire is the right front tire W2 or the left rear tire W3 if dF<1.

17. A tire pressure drop detecting device according to claim 16, further comprising means for prescribing that in a state where the vehicle is linearly traveling, the reduced pressure tire is the left front tire W1 if F1>F2, the reduced pressure tire is the right front tire W2 if F1<F2, the reduced pressure tire is the left rear tire W3 if F3>F4, and the reduced pressure tire is the right rear tire W4 if F3<F4.

18. A tire pressure drop detecting device according to claim 15, further comprising means for comparing the sum of the rotational angular velocities (F1+F2) of the front pair of tires W1 and W2 with the sum of the rotational angular velocities (F3+F4) of the rear pair of tires W3 and W4 as the vehicle is traveling at an approximately constant speed and substantially linearly when it is judged that there is a tire whose pneumatic pressure is reduced, to prescribe that at least one of the tires of the pair of tires having the rotational angular velocities whose sum is the larger of the front pair of tires and the rear pair of tires is a tire whose pneumatic pressure is reduced.

19. A tire pressure drop detecting device according to any one of claims 15 to 18, further comprising judging means for judging whether or not said four-wheel vehicle is in a state previously determined to be unsuitable for detection of a tire pressure reduction, said operating means not finding the ratio dF when said judging means judges that the four-wheel vehicle is in a state previously determined to be unsuitable for the detection.

20. A tire pressure drop detecting device according to claim 22, wherein a state previously determined to be unsuitable for the detection of a tire pressure reduction includes any of:

(1) a state where the four-wheel vehicle is traveling at a low speed of not more than a predetermined speed, (2) a state where the four-wheel vehicle is being accelerated or decelerated at not less than a predetermined rate, (3) a state-where the four-wheel vehicle is cornering at a smaller radius than a predetermined radius of curvature, (4) a state where lateral acceleration of not less than a predetermined value is produced in the four-wheel vehicle, (5) a state where
the four-wheel vehicle is changed from a linearly traveling condition to a cornering condition, or from a cornering state to a linearly traveling condition, and
the rate of change in the lateral acceleration produced by the change in traveling conditions exceeds a predetermined specified value, and (6) a state where a device provided for the four-wheel vehicle, which device renders the tires unsuitable for the detection of a tire pressure reduction, is being operated.

21. A tire pressure drop detecting device according to claim 19, further comprising correcting means for correcting the rotational angular velocity of each of the tires detected by the rotational angular velocity detecting means based upon the behavior of said four wheel vehicle, said operating means employing the corrected rotational angular velocities of the respective tires corrected by said correcting means.

22. A tire pressure drop detecting device for a four-wheel vehicle having four tires, comprising:

rotational angular velocity detecting means for each tire, each rotational angular velocity detecting means including
pulse outputting means provided in relation to a corresponding tire for outputting pulses at a rate proportional to the speed of rotation of the corresponding tire;
counting means connected to the pulse outputting means for counting the pulses applied from the pulse outputting means within a predetermined measuring period;
storing means for storing the time when the last pulse within each of the measuring periods is applied to the counting means;
means for calculating the time elapsed from the time when the last pulse in the preceding measuring period is applied to the time when the last pulse in the present measuring period is applied, which calculated time is stored in the storing means as reference time of the present measuring period;
means for dividing the number of pulses applied within the present measuring period by said reference time, to calculate a number of pulses per unit time; and
means for calculating the rotational angular velocity of the corresponding tire on the basis of said calculated number of pulses per unit time; and reduced pressure tire judging means for comparing the calculated rotational angular velocities of the four tires, to judge whether or not the pneumatic pressure of one of the tires is reduced.

23. A tire pressure drop detecting device according to claim 22, wherein said counting means counts the pulses applied from the pulse outputting means on the basis of the arising edges or the falling edges of the pulses.

24. A tire pressure drop detecting device according to claim 22, wherein said reduced pressure tire judging means finds, on the basis of the calculated rotational angular velocities of the four tires, the ratio of the sum of the rotational angular velocities of a first pair of tires to the sum of the rotational angular velocities of a second pair of tires, the first pair of tires being spatially arranged on a diagonal line relative to the four tires of the vehicle, to judge whether or not the pneumatic pressure of a tire is reduced depending on whether the found ratio is larger or smaller than a predetermined value.

25. A tire pressure drop detecting device according to claim 24, further comprising vehicle state judging means for judging whether or not said four-wheel vehicle is in a state previously determined to be unsuitable for detection of a tire pressure reduction, said reduced pressure tire judging means not performing an operation for the detection of a tire pressure reduction when said judging means judges that the four-wheel vehicle is in a state previously determined to be unsuitable for the detection.

26. A tire pressure drop detecting device according to claim 25, wherein a state previously determined to be unsuitable for the detection of a tire pressure reduction includes any of:

(1) a state where the four-wheel vehicle is traveling at a low speed of not more than a predetermined speed, (2) a state where the four-wheel vehicle is being accelerated or decelerated at not less than a predetermined rate, (3) a state where the four-wheel vehicle is cornering at a smaller radius than a predetermined radius of curvature, (4) a state where lateral acceleration of not less than a predetermined value is produced in the four-wheel vehicle, (5) a state where
the four-wheel vehicle is changed from a linearly traveling condition to a cornering condition, or from a cornering condition to a linearly traveling condition, and
the rate of change in the lateral acceleration produced by the change in traveling conditions exceeds a predetermined specified value, and (6) a state where a device provided for the four-wheel vehicle, which device renders the tires unsuitable for the detection of a tire pressure reduction, is being operated.

27. A tire pressure drop detecting device according to any one of claims 22 to 26, wherein said rotational angular velocity detecting means comprises correcting means for correcting the rotational angular velocity of each of the tires calculated by the means for calculating the rotational angular velocity, based upon the behavior of said four-wheel vehicle.

28. A tire pressure drop detecting device according to any one of claims 22 to 26, wherein the tire pressure drop detecting device is employed in a vehicle provided with an anti-lock braking system, such that the pulse outputting means and the counting means of the tire pressure drop detecting device are also used by the anti-lock braking system.

29. A tire pressure drop detecting device according to any one of claims 22 to 26, wherein the tire pressure drop detecting device is employed in a four-wheel vehicle provided with an anti-lock braking system, and said storing means, said means for calculating and said reduced pressure tire judging means are realized by using at least some components of a microcomputer of the anti-lock braking system.

30. A tire pressure drop detecting device according to claim 29, wherein said pulse outputting means and said counting means of the tire pressure drop detecting device are also used by the anti-lock braking system.

31. A tire pressure drop detecting method for a four-wheel vehicle having four tires, comprising:

respectively detecting the rotational angular velocities of the four tires by, for each tire,
outputting pulses at a rate proportional to the speed of rotation of the respective tire,
counting the outputted pulses within a predetermined measuring period,
storing the time when the last pulse within each of the measuring periods is counted,
calculating the time elapsed from the time when the last pulse in the preceding measuring period is counted to the time when the last pulse in the present measuring period is counted, and storing the calculated time as a reference time of the present measuring period,
dividing the number of pulses counted within the present measuring period by said reference time, to calculate a number of pulses per unit time and
calculating the rotational angular velocity of the respective tire on the basis of said calculated number of pulses per unit time;

finding, from said detected rotational angular velocities of the four tires, the ratio of the sum of the rotational angular velocities of a first pair of tires to the sum of the rotational angular velocities of a second pair of tires, the first pair of tires being spatially arranged on a diagonal line relative to the four tires;

judging that the pneumatic pressure of a tire is reduced based on whether said found ratio is larger or smaller than a predetermined value;

judging whether said four-wheel vehicle is in a state previously determined to be unsuitable for detection of a tire pressure reduction; and inhibiting judgement of a tire pressure reduction when it is judged that said four-wheel vehicle is in a state previously determined to be unsuitable for the detection of a tire pressure reduction.

32. A tire pressure drop detecting method according to claim 31, wherein a state previously determined to be unsuitable for the detection of a tire pressure reduction includes any of:

(1) a state where the four-wheel vehicle is traveling at a low speed of not more than a predetermined speed, (2) a state where the four-wheel vehicle is being accelerated or decelerated at not less than a predetermined rate, (3) a state where the four-wheel vehicle is cornering at a smaller radius than a predetermined radius of curvature, (4) a state where lateral acceleration of not less than a predetermined value is produced in the four-wheel vehicle, (5) a state where
the four-wheel vehicle is changed from a linearly traveling condition to a cornering condition, or from a cornering condition to a linearly traveling condition, and
the rate of change in the lateral acceleration produced by the change in traveling conditions exceeds a predetermined specified value, and (6) a state where a device provided for the four-wheel vehicle, which device renders the tires unsuitable for the detection of a tire pressure reduction, is being operated.

33. A tire pressure drop detecting method according to claims 31 or 32, further comprising the steps of correcting said detected rotational angular velocity of each of the tires based on the behavior of said four-wheel vehicle, and applying said corrected rotational angular velocities of the respective tires in finding the ratio of the sum of the rotational angular velocities of the first pair of tires to the sum of the rotational angular velocities of the second pair of tires.

34. A tire pressure drop detecting method according to claim 33, wherein the detected rotational angular velocities of the respective tires are corrected depending on the travel speed of the four-wheel vehicle.

35. A tire pressure drop detecting method according to claim 33, wherein the detected rotational angular velocities of the respective tires are corrected when the four-wheel vehicle is cornering.

36. A tire pressure drop detecting method according to claim 35, wherein it is judged that the vehicle is cornering when the difference or the ratio of the rotational angular velocities of the left and right front tires exceeds a specified value or the difference or the ratio of the rotational angular velocities of the left and right rear tires exceeds a specified value.

37. A tire pressure drop detecting method according to claim 35, wherein it is judged that the vehicle is cornering when the difference or the ratio of the rotational angular velocities of the left and right front tires exceeds a specified value and the difference or the ratio of the rotational angular velocities of the left and right rear tires exceeds a specified value.

38. A tire pressure drop detecting method for a four-wheel vehicle having four tires, comprising the steps of:

respectively detecting the rotational angular velocity $F1$ of a left front tire $W1$, the rotational angular velocity $F2$ of a right front tire $W2$, the rotational angular velocity $F3$ of a left rear tire $W3$ and the rotational angular velocity $F4$ of a right rear tire $W4$ of the four-wheel vehicle by, for each tire, outputting pulses at a rate proportional to the rotation of the respective tire, counting the pulses outputted within a predetermined measuring period, storing the time when the last pulse within each of the measuring periods is counted, calculating a time elapsed from the time when the last pulse in the preceding measuring period is counted to the time when the last pulse in the present measuring period is counted, and storing the calculated time as a reference time of the present measuring period, dividing the number of pulses counted within the present measuring period by the reference time, to calculate a number of pulses per unit time, and calculating the rotational angular velocity of the respective tire on the basis of said calculated number of pulses per unit time;

finding, from the detected rotational angular velocities of the respective tires, a ratio dF of the sum of the rotational angular velocities (F1+F4) to the sum of the rotational angular velocities (F2+F3); and judging that there is no tire whose pneumatic pressure is reduced if the found ratio dF is in the range of $(1+a_1)$ and $(1-a_2)$, where $a_1$ and $a_2$ are constants determined by the vehicle, while judging that there is a tire whose pneumatic pressure is reduced if the found ratio dF is outside said range.

39. A tire pressure drop detecting method according to claim 38, further comprising the step of prescribing that the reduced pressure tire is the left front tire W1 or the right rear tire W4 if dF>1, and the reduced pressure tire is the right front tire W2 or the left rear tire W3 if dF<1.

40. A tire pressure drop detecting method according to claim 39, further comprising the step of prescribing that in a state where the four-wheel vehicle is-linearly traveling, the reduced pressure tire is the left front tire W1 if F1>F2, the reduced pressure tire is the right front tire W2 if F1<F2, the reduced pressure tire is the left rear tire W3 if F3>F4, and the reduced pressure tire is the right rear tire W4 if F3<F4.

41. A tire pressure drop detecting method according to claim 38, further comprising the step of comparing the sum of the rotational angular velocities (F1+F2) of the front pair of tires W1 and W2 with the sum of the rotational angular velocities (F3+F4) of the rear pair of tires W3 and W4 where the vehicle is traveling at an approximately constant speed and substantially linearly when it is judged that there is a tire whose pneumatic pressure is reduced, to prescribe that at least one of the tires of the pair of tires having the rotational angular velocities whose sum is the larger of the two pairs of tires is a tire whose pneumatic pressure is reduced.

42. A tire pressure drop detecting method according to any one of claims 38 to 41, further comprising judging whether said four-wheel vehicle is in a state previously determined to be unsuitable for detection of a tire pressure reduction, and inhibiting judgement that a tire pressure is reduced when it is judged that said four-wheel vehicle is in a state previously determined to be unsuitable for the detection of a tire pressure reduction.

43. A tire pressure drop detecting method according to claim 42, wherein a state previously determined to be unsuitable for the detection of a tire pressure reduction includes any of:

(1) a state where the four-wheel vehicle is traveling at a low speed of not more than a predetermined speed, (2) a state where the four-wheel vehicle is being accelerated or decelerated at not less than a predetermined rate, (3) a state where the four-wheel vehicle is cornering at a smaller radius than a predetermined radius of curvature, (4) a state where lateral acceleration of not less than a predetermined value is produced in the four-wheel vehicle, (5) a state where the four-wheel vehicle is changed from a linearly traveling condition to a cornering condition, or from a cornering condition to a linearly traveling condition, and the rate of change in the lateral acceleration produced by the change in traveling conditions exceeds a predetermined specified value, and (6) a state where a device provided for the four-wheel vehicle, which device renders the tires unsuitable for the detection of a tire pressure reduction, is being operated.

44. A tire pressure drop detecting method according to claim 43, further comprising the steps of correcting said detected rotational angular velocity of each of the tires based on the behavior of said four-wheel vehicle, and applying said corrected rotational angular velocities of the respective tires in finding the ratio dF of the sum of the rotational angular velocities (F1+F4) to the sum of the rotational angular velocities (F2+F3).

45. A tire rotational angular velocity determining device, for use with a tire pressure drop detecting device in a vehicle with a tire, the tire rotational angular velocity determining device comprising:

pulse outputting means provided proximal to the tire, for outputting pulses at a rate proportional to the rotation of the tire;

counting means connected to the pulse outputting means for counting the pulses applied from the pulse outputting means within each of a plurality of sequential predetermined measuring periods;

storing means for storing the time when the last pulse within each of the measuring periods is applied to the counting means;

means for calculating the time elapsed from the time when the last pulse in a preceding measuring period is applied to the time when the last pulse in a present measuring period is applied, which calculated time is stored in the storing means as a reference time of the present measuring a period;

means for dividing the number of pulses applied within the present measuring period which are counted by said counting means by said reference time, to calculate a number of pulses per unit time; and means for calculating the rotational angular velocity of the tire on the basis of said calculated number of pulses per unit time.

46. A tire rotational angular velocity determining device according to claim 45, wherein the counting means counts the pulses applied from the pulse outputting means on the basis of the arising edges or the falling edges of the pulses.

47. A tire rotational angular velocity determining device according to claim 45, further including correcting means for correcting the rotational angular velocity of the tire based upon the behavior of the vehicle.

48. A tire rotational angular velocity determining device according to claim 45, wherein the tire rotational angular velocity determining device is employed in a vehicle provided with an anti-lock braking system, such that the pulse outputting means and the counting means of the tire pressure drop detecting device are also used by the anti-lock braking system.

49. A tire rotational angular velocity determining device according to claim 45, wherein the tire rotational angular velocity determining device is employed in a vehicle provided with an anti-lock braking system, and the storing means and the means for calculating are realized by using at least some components of a microcomputer of the anti-lock braking system.

50. A tire rotational angular velocity determining device according to claim 49, wherein the pulse outputting means and the counting means of the tire rotational angular velocity determining device are also used the anti-lock braking system.

* * * * *